US009648287B2

(12) United States Patent
Carl

(10) Patent No.: US 9,648,287 B2
(45) Date of Patent: May 9, 2017

(54) NOTE CAPTURE DEVICE

(76) Inventor: Stewart Carl, Palo Alto, CA (US)

( * ) Notice: Subject to any disclaimer, the term of this patent is extended or adjusted under 35 U.S.C. 154(b) by 1172 days.

(21) Appl. No.: 12/541,833

(22) Filed: Aug. 14, 2009

(65) Prior Publication Data

US 2010/0045785 A1    Feb. 25, 2010

Related U.S. Application Data

(63) Continuation of application No. PCT/US2008/054179, filed on Feb. 15, 2008.
(Continued)

(51) Int. Cl.
H04N 7/18        (2006.01)
G06F 3/0488      (2013.01)
G06K 9/00        (2006.01)
H04N 1/00        (2006.01)
H04N 5/225       (2006.01)
H04N 5/44        (2011.01)
H04N 5/781       (2006.01)

(52) U.S. Cl.
CPC ......... *H04N 7/183* (2013.01); *G06F 3/04883* (2013.01); *G06K 9/00402* (2013.01); *H04N 1/0044* (2013.01); *H04N 1/00249* (2013.01); *H04N 1/00265* (2013.01); *H04N 1/00267* (2013.01); *H04N 1/00307* (2013.01); *H04N 1/00326* (2013.01); *H04N 1/00448* (2013.01); *H04N 1/00453* (2013.01); *H04N 1/00461* (2013.01); *H04N 5/2252* (2013.01); *H04N 5/4403* (2013.01); *H04N 5/781* (2013.01); *H04N 2201/0027* (2013.01); *H04N 2201/0039* (2013.01)

(58) Field of Classification Search
None
See application file for complete search history.

(56) References Cited

U.S. PATENT DOCUMENTS 5,903,667 A * 5/1999 Kuzunuki et al. ............ 382/187
6,351,259 B2    2/2002 Breiner
(Continued)

FOREIGN PATENT DOCUMENTS

CN    1648841    3/2005
EP    1553488    7/2005
(Continued)

OTHER PUBLICATIONS

International Search Report, PCT/US 08/54179, International Filing Date Feb. 15, 2008, Jul. 25, 2008, Stewart Carl.
(Continued)

*Primary Examiner* — James M Anderson, II
(74) *Attorney, Agent, or Firm* — TIPS Group

(57) ABSTRACT

Various example embodiments provide a note capture device comprising a writing surface, a camera mounted to view the writing surface, and electronic circuitry to capture images of said surface, or various alternative surfaces, including for example, a business card surface. Notes are captured upon a determination of completion of the note writing, and either stored or forwarded to an external device, or both. Handwriting recognition software is provided to enhance searchability of captured notes. Application software embodied on various devices provides the ability to view, browse, share, search and edit captured notes and associated data.

13 Claims, 20 Drawing Sheets

Related U.S. Application Data

(60) Provisional application No. 60/890,180, filed on Feb. 15, 2007.

(56) References Cited

U.S. PATENT DOCUMENTS

| | | | |
|---|---|---|---|
| 6,396,481 B1 * | 5/2002 | Challa et al. | 345/169 |
| 6,425,525 B1 | 7/2002 | Swaminathan et al. | |
| 6,504,956 B1 * | 1/2003 | Gannage et al. | 382/188 |
| 6,674,426 B1 | 1/2004 | McGee et al. | |
| 6,840,442 B2 | 1/2005 | Swaminathan et al. | |
| 6,965,460 B1 | 11/2005 | Gann et al. | |
| 7,006,665 B2 | 2/2006 | Olson et al. | |
| 7,044,363 B2 | 5/2006 | Silverbrook et al. | |
| 7,088,459 B1 | 8/2006 | Silverbrook et al. | |
| 7,098,891 B1 | 8/2006 | Pryor | |
| 7,173,651 B1 | 2/2007 | Knowles | |
| 7,289,113 B2 * | 10/2007 | Martin | 345/178 |
| 2002/0176015 A1 | 11/2002 | Lichtfuss | |
| 2004/0140965 A1 * | 7/2004 | Wang et al. | 345/179 |
| 2005/0041953 A1 | 2/2005 | Lo | |
| 2005/0078871 A1 * | 4/2005 | Pollard et al. | 382/219 |
| 2005/0148418 A1 | 7/2005 | Yang | |
| 2005/0200636 A1 | 9/2005 | Silverbrook et al. | |
| 2006/0088230 A1 * | 4/2006 | Silverbrook et al. | 382/313 |
| 2007/0011140 A1 * | 1/2007 | King et al. | 707/3 |
| 2007/0024714 A1 | 2/2007 | Kim et al. | |
| 2007/0140965 A1 * | 6/2007 | Lanza et al. | 424/1.49 |

FOREIGN PATENT DOCUMENTS

| | | |
|---|---|---|
| JP | 2006078752 A * | 3/2006 |
| TW | 468330 | 12/2001 |
| TW | 548966 | 8/2003 |
| TW | I239747 | 9/2005 |
| TW | I240551 | 9/2005 |
| WO | WO 2008/101224 A2 | 8/2008 |
| WO | WO 2008/101224 A3 | 8/2008 |

OTHER PUBLICATIONS

Automated Registration of High-Resolution Images from Slide Presentation and Whiteboard Handwriting via a Video Camera, Weihong Li, Hao Tang and Zhigang Zhu, Department of Computer Science, City College, The City University of New York, NY, Jun. 22, 2006.

Interaction Techniques for Navigation through and Manipulation of 2D and 3D Data, Dzitry Aliakseyeu, Sriam Subramanian, Jean-Bernard Martens, Matthias Rauterberg, User Centered Engineering Group, Faculty of Technology Management, Eindoven University of Technology, The Netherlands, © The Eurographics Association 2002.

Combining Data and Voice Communications on Digital Wireless Networks, Shankar Narayanaswamy, Jianying Hu, Ramunujan Kashi, Bell Laboratories, Nov. 1998.

Protech Projection Systems, Inc., http://www.protechprojection.com/documents_cameras, Oct. 17, 2006.

ELMO, USA, http://www.elmousa.com/presentation/company.htm.

Military Geospacial Technology Online Archives, New Eye in the Sky, http://www.military-geospatial-technology.com/article.cfm?DocID=1545, Oct. 17, 2006.

Tactical Imagery Intelligence Operations TJIDBT, Feb. 1996, http://www.fas.org/irp/doddir/army/tacimlp.htm, Oct. 17, 2006.

The Design of Personal Mobile Technologies for Lifelong Learning, Mike Sharples, Educational Technology Research Group, School of Electronic and Electrical Engineering, University of Birmingham; Computers & Education, vol. 34, No. 3, 177-193 (2000) http://www.elsevier.com/locate/compadu.

* cited by examiner

Typical Sensor Truth Table

| | ① | ② | ③ | ④ |
|---|---|---|---|---|
| A. PALM REST | − | − | + | + |
| B. PROXIMITY | − | − | + | + |
| C. PAGE REMOVE | − | − | − | − |
| D. IMAGE MATCH | − | + | − | − |
| E. IMAGE CORRESPOND | − | + | − | − |
| F. IMAGE BLANK | + | ± | − | − |
| G. PEN DOWN | − | | + | + |

FIG. 13

| | ⑤ | ⑥ | ⑦ | ⑧ |
|---|---|---|---|---|
| | Hi | Hi | Hi! | Hi! |
| A. PALM REST | − | − | + | − |
| B. PROXIMITY | + | + | + | − |
| C. PAGE REMOVE | − | − | − | − |
| D. IMAGE MATCH | − | + | − | − |
| E. IMAGE CORRESPOND | − | − | − | + (Image 5&6) |
| F. IMAGE BLANK | − | − | − | − |
| G. PEN DOWN | − | − | + | − |

FIG. 14

| | ⑨ | ⑩ | ⑪ | ⑫ |
|---|---|---|---|---|
| | Hi! | Hi! 👆 | 👆 | |
| A. PALM REST | − | + | − | − |
| B. PROXIMITY | + | + | + | − |
| C. PAGE REMOVE | − | − | + | − |
| D. IMAGE MATCH | + | − | − | − |
| E. IMAGE CORRESPOND | + (5,6,8) | − | − | + |
| F. IMAGE BLANK | − | − | − | + |
| G. PEN DOWN | − | − | − | − |

FIG. 15

NOTE CAPTURE DEVICE

CROSS-REFERENCE TO RELATED APPLICATIONS

This application is a continuation of PCT/US2008/054179, filed Feb. 15, 2008, which claims the benefit of U.S. Ser. No. 60/890,180, filed Feb. 15, 2007, both of which are incorporated herein by reference.

BACKGROUND

Example embodiments disclosed herein pertain to digital electronic devices used to capture information. More particularly, example embodiments disclosed herein pertain to devices used to capture handwriting and related metadata.

Handwritten notes have been used throughout recorded history as a convenient way to record information. Although the technology for producing paper and writing implements such as pens and pencils have changed somewhat over the years, the actual methods for writing handwritten notes have gone virtually unchanged for millennia. This fact is a testament to the convenience and effectiveness of this form of recording information.

With the advent of electronic computers, various attempts to improve upon handwritten notes have been made. Notably, "Personal Digital Assistants" (PDAs) and "Pen Computers" have been developed to capture handwriting and provide various organizational services.

Handwriting recognition is often provided in PDAs and Pen Computers in order to obtain the benefits of being able to search and edit the information.

Handwriting recognition is the ability of a computer to receive intelligible handwritten input. The image of the written text may be sensed "offline" from a piece of paper by optical scanning (optical character recognition). Alternatively, the movements of the pen tip may be sensed "online," for example by a pen-based computer screen surface.

Early attempts at handwriting recognition suffered from recognition accuracy problems. It is generally understood that recognition algorithms do not have the contextual perception of a human reader, and thus have difficulty capturing handwritten information. Even human beings sometimes have difficulty interpreting handwriting.

Palm launched a successful series of PDAs based on the Graffiti® recognition system. Graffiti® improved usability by defining a set of pen strokes for each character. This narrowed the possibility for erroneous input, although memorization of the stroke patterns did increase the learning curve for the user.

In recent years, several attempts were made to produce ink pens that include digital elements, such that a person could write on paper, and have the resulting text stored digitally. The success of these products is yet to be determined.

It has become clear that real time handwriting recognition places an undue burden on a user when he is taking notes—the very time he is concentrating on the subject of his note, he is interrupted with the need to correct recognition errors, or to cope with a new form of writing such as Graffiti®.

The tactile sensation of writing on paper is also diminished when using a typical PDA or pen computer. Rather than the familiar padded surface of a pad of paper, and the familiar drag which stabilizes the writing implement, one is presented with a surface that is hard and which has dramatically less friction. Users are forced to compensate by stabilizing the pen themselves. This unfamiliar mode of writing may also intrude on a user's thought processes when writing about the subject of a particular note.

Post-it notes, invented and manufactured by 3M, is a piece of stationery with a readherable strip of adhesive on the back, designed for temporarily attaching notes to documents, computer displays, and so forth. While now available in a wide range of colors, shapes, and sizes, the most common size of Post-it note is a 3 inch square, trademark canary yellow in color.

Post-it notes have emerged as a convenient medium for informal notes for recording reminders, phone numbers, phone messages, etc. They feature a low-tack adhesive strip that enables each note to be easily attached and removed without leaving marks or residue. Usage of Post-it Notes is ubiquitous. This kind of note taking represents a very high standard of convenience at the moment of note taking. The user simply writes on the note pad, removes the note, and subsequently places the note in a prominent place as a reminder, or on a document as an annotation, etc.

The electronic devices of the prior art fail to achieve the level of convenience in note taking that is achieved when writing a Post-it note. What is needed is a means to combine the convenience of Post-it notes with the benefits of electronic capture for transmissibility, searching, and editing. Unfortunately, the prior art is limited in that it does not provide any such solution.

These and other limitations of the prior art will become apparent to those of skill in the art upon a reading of the following descriptions and a study of the several figures of the drawing.

SUMMARY

Certain non-limiting example embodiments provide a note capture device comprising a writing surface, a camera mounted to view the writing surface, and electronic circuitry to capture images of said surface, or various alternative surfaces, including for example, a business card surface. Various image transformations are contemplated which may, for example, correct for an oblique camera angle with respect to the surface(s). Other transformations to enhance readability of an image, or add indicia, logos, etc. are also contemplated.

Certain example embodiments provide for automatic detection of the completion of writing a note, and upon detection, induce capture of the completed note. Certain embodiments employ various sensors to detect the completion of the note writing. Other embodiments perform this detection through the use of button click. Still other embodiments perform this detection through image analysis. Various combinations of these embodiments are contemplated.

In certain example embodiments and combinations, captured images are stored internally, transmitted electronically to external devices, such as personal computers, cell phones, servers, etc. The mode of communication between the note capture device and the external device may include a cable coupling the devices directly or indirectly, or a wireless connection which couples the devices directly or indirectly. It is further contemplated that the communication may take place through the use of removable media such as magnetic media, flash memory devices, and other non volatile storage devices and media. Other commonly used methods of transferring data from one device to another are also contemplated.

In certain embodiments, a screen is provided to allow a user to interact with the note capture device for the purpose of routing captured notes to various destinations, and to direct the various modes of communication such various protocols including, by way of example and not limitation, SMTP, FTP, SFTP, HTTP, HTTPS, file sharing protocols such as those provided by various commercially available operating systems, including Windows, Mac OS, Linux, CE Mobile, Palm OS, Symbian, Java based OSes etc.

In various modes of operation, handwriting recognition software may be used to produce text representing the captured note in whole or in part. Such recognized text may accompany the image information associated with a note, or may be used in place of said image information.

The image information associated with a note may be transformed in various ways, including being transformed into stroke information, or compressed etc.

Certain other example embodiments may include a planar image capture device that includes a rest surface defining a base image plane and a solid-state camera device defining an optical axis that is oblique to said base image plane. As used herein, a solid state camera generally refers to a camera made from semiconductor processing technology and therefore will not necessarily include one or more lenses. However, various types of other cameras could perhaps be used in conjunction with the claimed embodiments.

Another example embodiment may include a planar image capture system which has a planar image capture device. The planar image capture device may have a rest surface defining a base image plane and a solid-state camera device defining an optical axis that is oblique to said base image plane, said camera device having a fixed optical focus with a depth of field that extends least about 2.5 inches but no more than about 7.5 inches from said solid-state camera device. Additionally, the system may include a computing device coupled to the planar image capture device capable of at least receiving image information from the capture device.

Yet another example embodiment may provide a method for providing image information. The method includes aiming a solid-state camera device having an optical axis that is oblique to a base image plane and having a fixed focus with a depth of field that extends at least about 2.5 inches but no more than about 7.5 inches from said solid-state camera device. The method also may include capturing image data with said solid-state camera and at least partially storing the image data in digital memory.

Another example embodiment provides for a computer-usable medium having computer-readable instructions stored thereon for execution by a processor to perform a method. The method includes aiming a solid-state camera device having an optical axis that is oblique to a base image plane and having a fixed focus with a depth of field that extends at least about 2.5 inches but no more than about 7/5 inches from the solid-state camera device, capturing image data with the solid-state camera and at least partially storing the image data in digital memory.

Still another example embodiment provides an image capture and transmission system that includes a network and a planar image capture device. The planar image capture device includes a rest surface defining a base image plane, a solid-state camera device defining an optical axis that is oblique to the base image plane, said camera device having a fixed optical focus with a depth of field that extends about at least 2.5 inches but no more than about 7.5 inches from the solid state camera device and a computing device integrated with said planar image capture device capable of at least receiving image information from the capture device. The planar image capture device is coupled to the network and is operable to transmit said image information over the network to another device.

These and other embodiments and advantages and other features disclosed herein will become apparent to those of skill in the art upon a reading of the following descriptions and a study of the several figures of the drawing.

Certain aspects of various example embodiments provide application software to view, browse, share, search and edit captured notes, their associated metadata, recognition results, etc. The various example embodiments include human interface software which may be associated with the user's "desktop" or various application windows.

BRIEF DESCRIPTION OF THE DRAWINGS

Several example embodiments will now be described with reference to the drawings, wherein like components are provided with like reference numerals. The example embodiments are intended to illustrate, but not to limit, the invention. The drawings include the following figures:

FIGS. 13, 14 and 15 show portions of a time line which describes some aspects of certain embodiments of the operation of FIG. 12 in greater detail;

DETAILED DESCRIPTION OF EXAMPLE EMBODIMENTS

Figure 1:
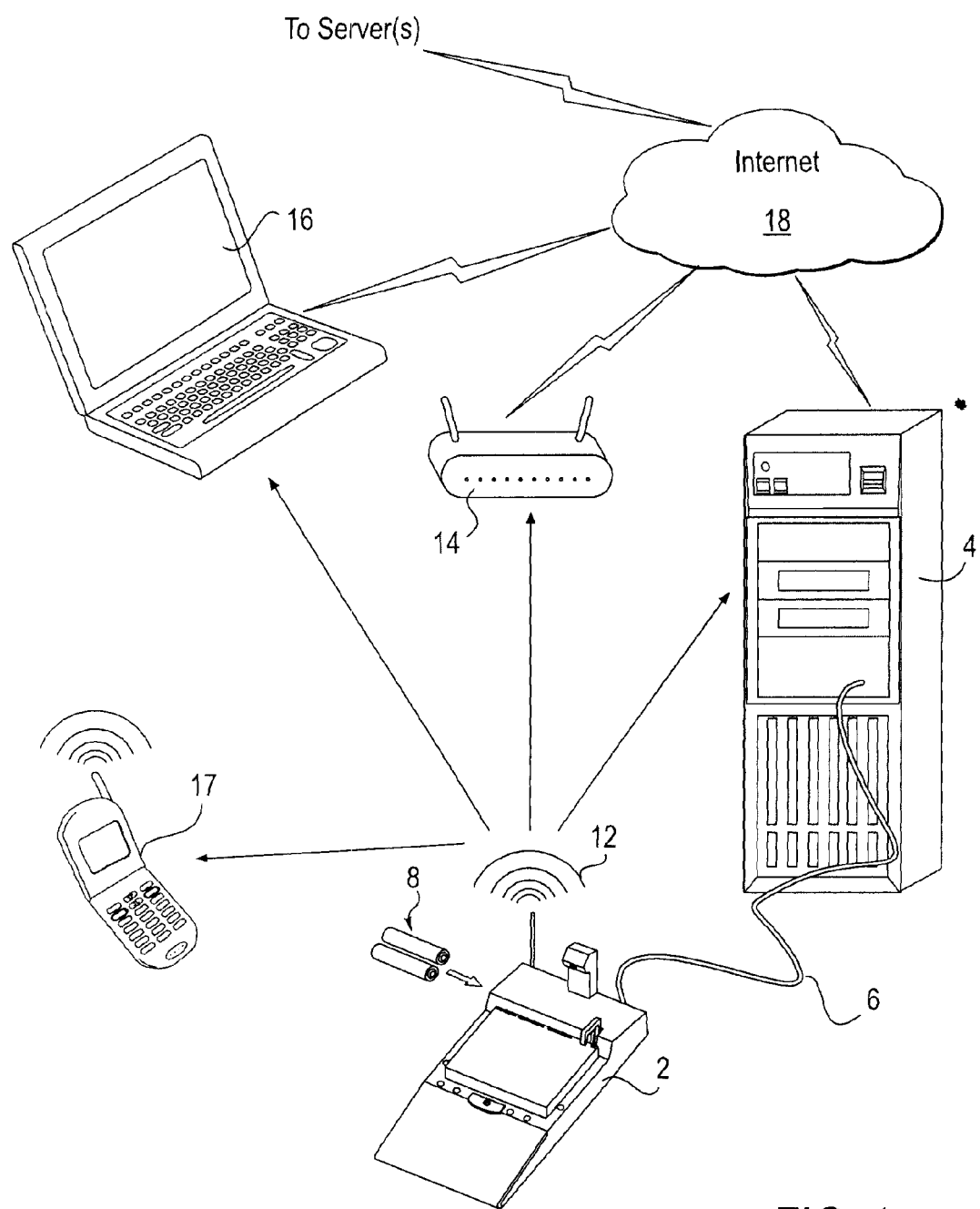
FIG. 1 is a high level diagram depicting a note capture device 2 and various other devices with which it communicates.

FIG. 1 is a high level diagram depicting a note capture device 2 and various other devices with which it communicates. For example, note capture device 2 may communicate with personal computer 4 via USB cable 6 in an example embodiment. It is also contemplated that note capture device 2 may communicate with personal computer 4 via other means. Note capture device 2 may be powered by batteries 8 in an example embodiment or by other means, such as, power adapter 10 (not shown) which derives power from, for example, an AC wall socket operating at 110 volts. Wireless communication subsystem 12 is used by note capture device 2 to communicate with various wireless devices such as personal computer 4, wireless internet router 14, laptop computer 16, and cell phone 17 in various example embodiments. These various devices with which note capture device 2 communicates may optionally be coupled to internet 18. The purpose of note capture device 2 is to provide an intuitive method for capturing handwritten information such as that contained in a Post-It Note. The captured handwritten information is then transmitted to one of the various devices with which note capture device 2 may communicate, including personal computer 4, wireless internet router 14, laptop computer 16 or cell phone 17. In certain example embodiments, the captured information may be stored on said device or forwarded via internet 18 to various electronic devices connected to internet 18, such as server 20 (not shown) or other personal computers 4, etc.

Figure 2:
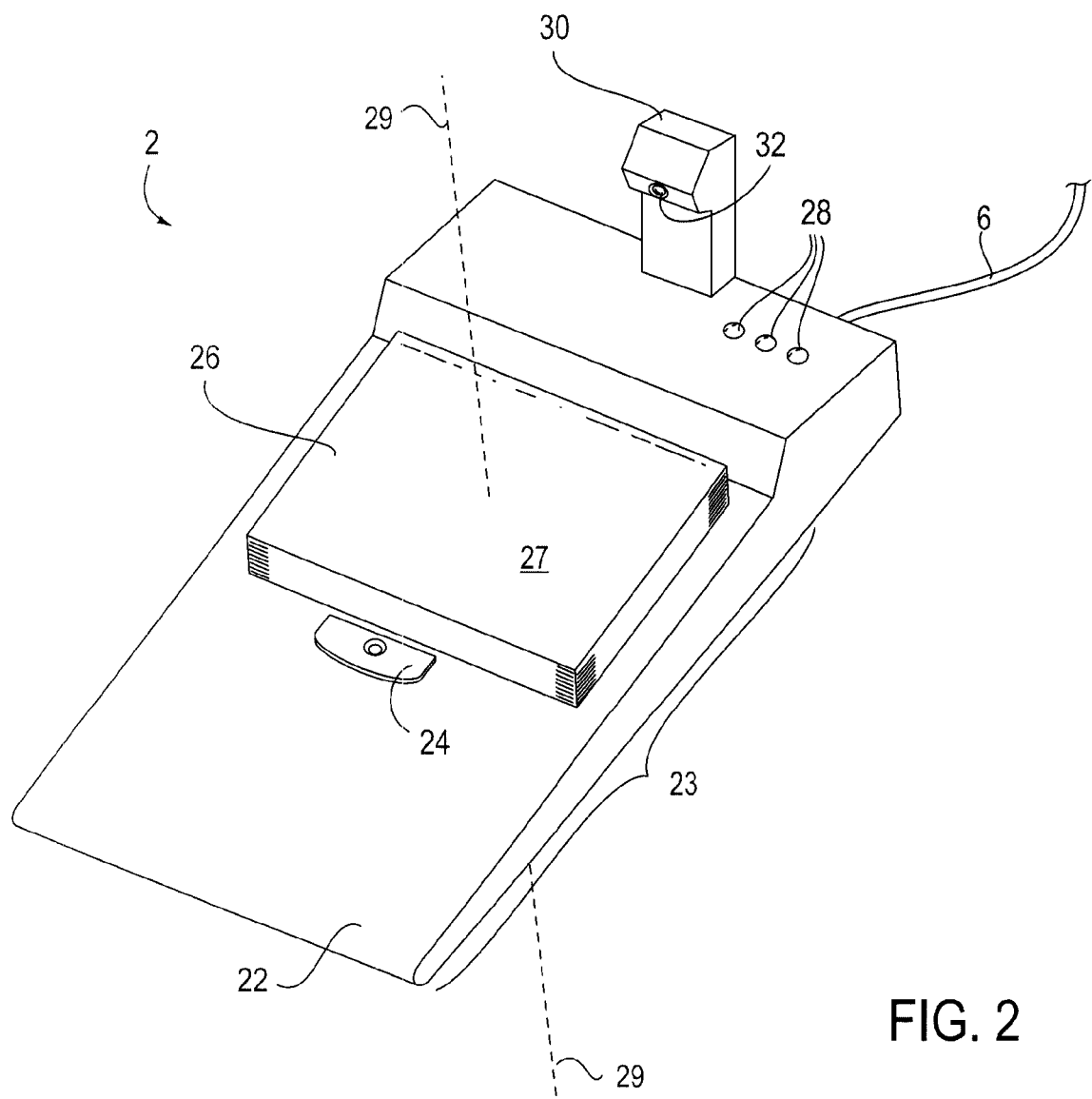
FIG. 2 shows note capture device 2 of FIG. 1 in greater detail.

FIG. 2 shows note capture device 2 of FIG. 1 in greater detail. Included in note capture device 2 is palm rest 22 (which also be referred to as a rest surface), copy button 24, notepad 26 of which a top page may be a writing surface that may be removable, function lamps 28, camera post 30, and camera head 32. Palm rest 22 is substantially continuous in that a relative area upon which a palm is in contact with palm rest 22 is substantially smaller than the total square area of palm rest 22. While other components exist internally, these components in various subsets, supersets, and combinations serve as the human interface for note capture device 2 in certain example embodiments. Various sensors and electronic apparatus not shown are needed to provide the functionality of note capture device 2 and will be discussed subsequently in greater detail. When using note capture device 2, the user simply takes a writing implement such as a pen or pencil and writes on the notepad. In an example embodiment, the completion of the writing on the notepad 26 is signaled by the user pressing copy button 24 or other manual or automatic trigger mechanism to indicate the completion of said writing. The image on the top note of notepad 26 is then sent to an external device via USB cable 6, wireless communication subsystem 12 or by other means. It should be noted that the image which is sent at this time may have been captured previously to the pressing of copy button 24. In other words, the pressing of copy button 24 indicates that the image should be sent and may or may not be used as a cue indicating that camera head 32 should activate and obtain the image. Camera head 32 may be active in a continuous mode or in an click to activate mode in conjunction with copy button 24. Additionally, reference numeral 23 generally depicts an elongated base assembly.

Pad 26, in some embodiments, may be of a type wherein each sheet of paper is held to another sheet by a weak, reusable adhesive compound.

In one embodiment by way of non-limiting example, a planar image capture device includes a rest surface defining a base image plane and a solid-state camera device defining an optical axis that is oblique to said base image plane. The solid state camera may also have a depth of field that extends about at least 2.5 inches but no more than about 7.5 inches from the solid state camera. Generally speaking, the depth of field is a distance for which an image on a surface will significantly be in focus as seen from a camera device. Also generally speaking, the depth of field is calibrated to a fixed range when the planar image capture device is assembled.

Figure 3A:
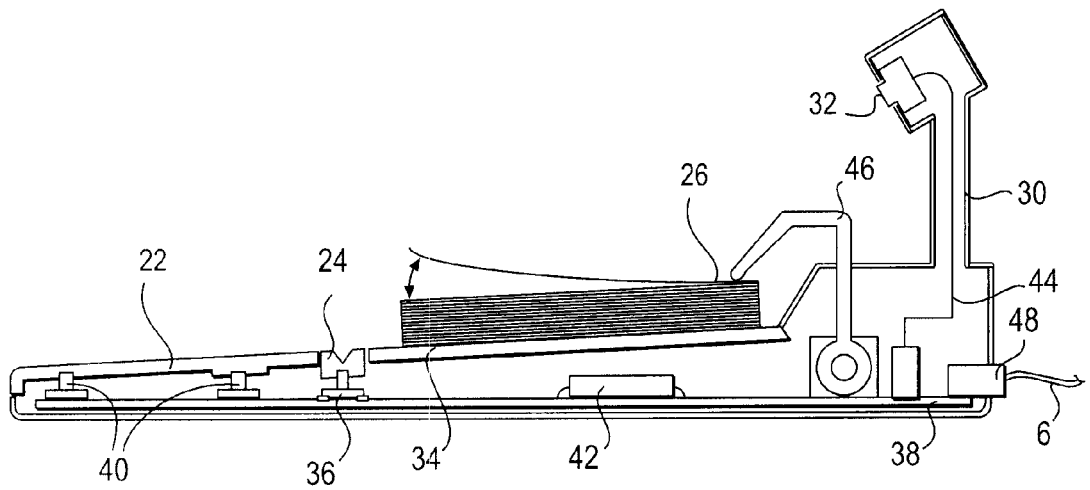
FIGS. 3A-3B show note capture device 2 of FIGS. 1 and 2 in still greater detail.

FIG. 3 shows note capture device 2 of FIGS. 1 and 2 in still greater detail. Notepad 26 rests on notepad rest 34 and provides a writing surface for the user. Copy button 24 is provided to allow the user to indicate that a note has been completed. A copy button microswitch 36 under copy button 24 is used to convert the motion of copy button 24 into an electrical signal to be used to indicate the completion of a note. In one embodiment, copy button microswitch 36 is mounted on printed circuit board 38. Palm rest 22 is in contact with palm rest microswitches 40 which are mounted on printed circuit board 38 in an example embodiment. Processor 42 is mounted on printed circuit board 38 and provides computation capability to implement the various functions of note capture device 2. Camera head 32 is mounted on structural supporting element 30 and is electrically connected via camera cable 44 to printed circuit board 38. The structural supporting element 30 may be defined as post or a display. Page removal detector 46 is provided in one non-limiting example embodiment to help in the detection of the removal of a note. This kind of detection can be achieved also by passive means through the analysis of the imagery obtained by camera head 32. In the various embodiments of note capture device 2, the number and type of sensors may vary greatly. Page removal detector 46, in one example embodiment, is spring loaded so it maintains constant physical contact with the top note of notepad 26. When page removal detector 46 detects motion indicating the removal of a note, an electrical signal is developed and propagated on to printed circuit board 38. This signal, as well as the various signals from the various sensors, including palm rest microswitches 40, copy button microswitch 36, page removal detector 46, as well as the imagery obtained by camera head 32 are all used together to help determine when a note is completed and should be captured. When a note is captured, a signal comprising the image of the note is transmitted to an external device such as personal computer 4, wireless internet router 14, laptop computer 16 or cell phone 17. The transmission of the image may occur in various ways including wireless communications via wireless communication subsystem 12 (not shown) or by physically connected means such as USB cable 6 connected to printed circuit board 38 via USB connector 48. USB cable 6 is but one of many possible physical connections. Alternatives include Ethernet cable and the like.

Figure 3B:
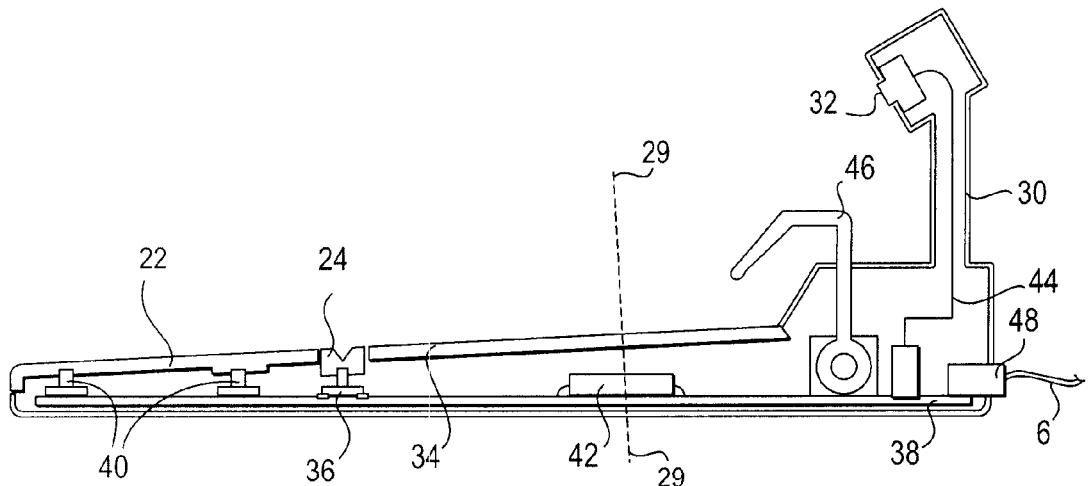

FIG. 2, and other figures, also depicts a base image plane 27 which comprises a substantially planar surface. It should be noted that the base image plane 27 may be of various shapes other than the generally square shape of notepad 26 and need not be continuous. Additionally, a perpendicular axis 29, as shown in FIG. 3B, is defined by the base image plane 27. As used herein, a "perpendicular depth of field" is defined a depth of field substantially parallel to the perpendicular axis 29 in which an image detected by the camera head 32 is sufficiently resolved for use by the system, e.g. the image is of sufficient focus and/or resolution for recognition and/or other purposes of the system.

Figure 4:
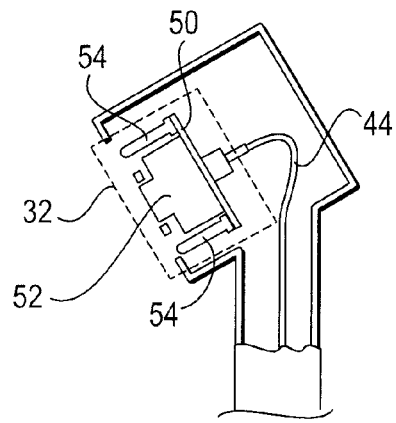
FIG. 4 shows camera head 32 of FIGS. 2 and 3 in greater detail.

FIG. 4 shows camera head 32 of FIGS. 2 and 3 in greater detail. Camera head 32 comprises, in one example embodiment, camera printed circuit board 50, camera assembly 52, and LEDs 54. Camera assembly 52 comprises a lens and camera sensor apparatus capable of transmitting a series of images obtained from the camera sensor over camera cable 44 to the other components notably processor 42 mounted on printed circuit board 38. LEDs 54 provide light, so that note capture device 2 and, more specifically, the writing surface of notepad 26 will be illuminated in various lighting conditions. The configuration shown in FIG. 4 of camera head 32 is but one example embodiment and should be construed in a non-limiting way.

Figure 5:
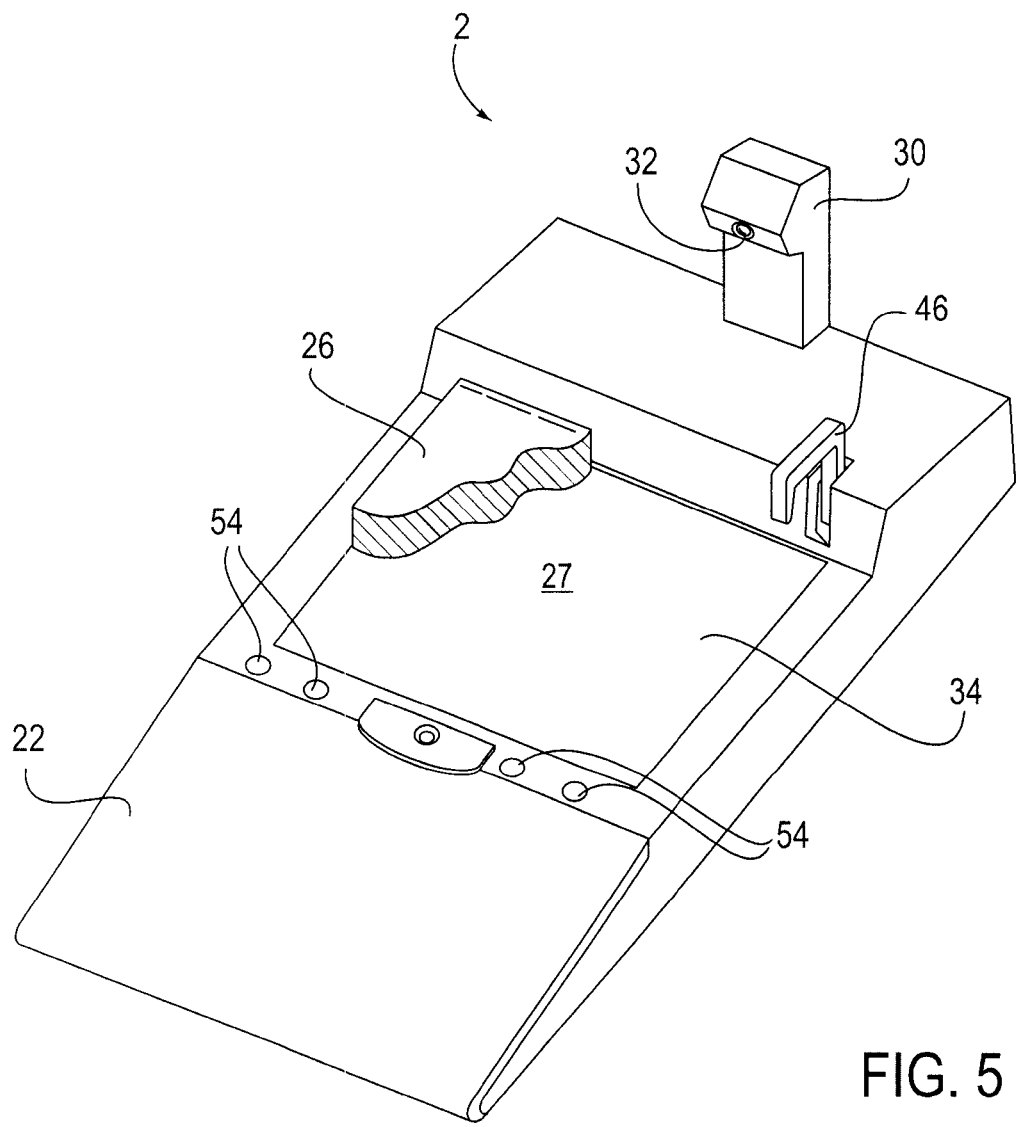
FIG. 5 shows note capture device 2 with still further sensor apparatus for detecting the various modes of operation.

FIG. 5 shows note capture device 2 with still further sensor apparatus for detecting the various modes of operation. Notably, in this embodiment, notepad rest 34 is pressure sensitive so that the application of pressure to notepad 26 will result in electrical signals that are propagated via printed circuit board 38 to processor 42 which indicate that writing activity is occurring. Proximity sensors 54 are also included in order to provide signals indicating that a hand is physically present above the notepad 26. The proximity sensors 54 similarly propagate electrical signals via printed circuit board 38 to processor 42. As discussed previously, palm rest 22 is pressure sensitive in order to provide a signal that a writing operation is taking place to processor 42. The output of the various sensors described herein is combined with the image information obtained from camera head 32, which has a field of view covering the writing surface provided by notepad 26. It should be noted that the field of view of camera head 32 is oblique since it is not directly over notepad 26. The height of structural supporting element 30 need only be high enough to provide an adequate view of notepad 26 such that the image data obtained may be corrected into a suitable image of the note.

Figure 6:
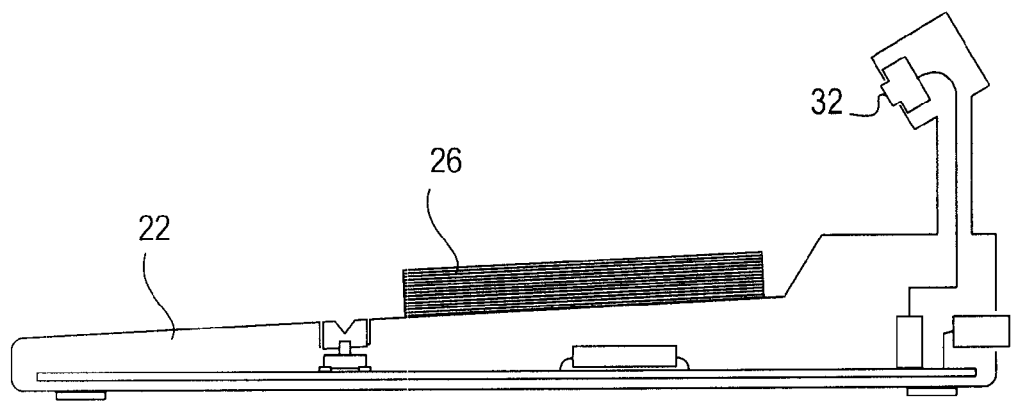
FIG. 6 shows the field of view of camera head 32 in greater detail.

FIG. 6 shows the field of view of camera head 32 in greater detail. As shown here in a non-limiting example embodiment, camera head 32 is aimed at the center of the writing surface of notepad 26. The portions of notepad 26 which are closer to palm rest 22 appear at a greater distance and, thus, use lower resolution in the resulting image than the portions of the image related to the center of notepad 26. Similarly, the portion of the image that is closest to the camera head uses more resolution in the image than the portions of the image associated with the center of notepad 26.

Figure 7:
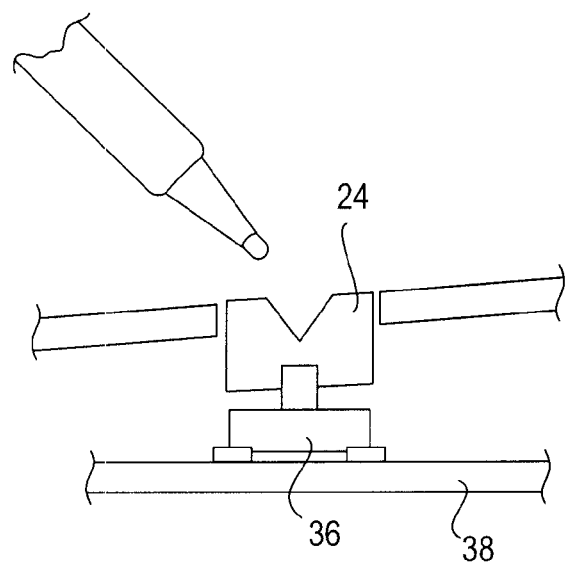
FIG. 7 shows copy button 24 in greater detail.

FIG. 7 shows copy button 24 in greater detail. An indentation in the surface of copy button 24 is provided in an example embodiment so that a pen, pencil or other writing implement may be used to easily press the button without sliding off of the copy button 24 which is in direct physical contact with copy button microswitch 36 mounted on printed circuit board 38.

Figure 8:
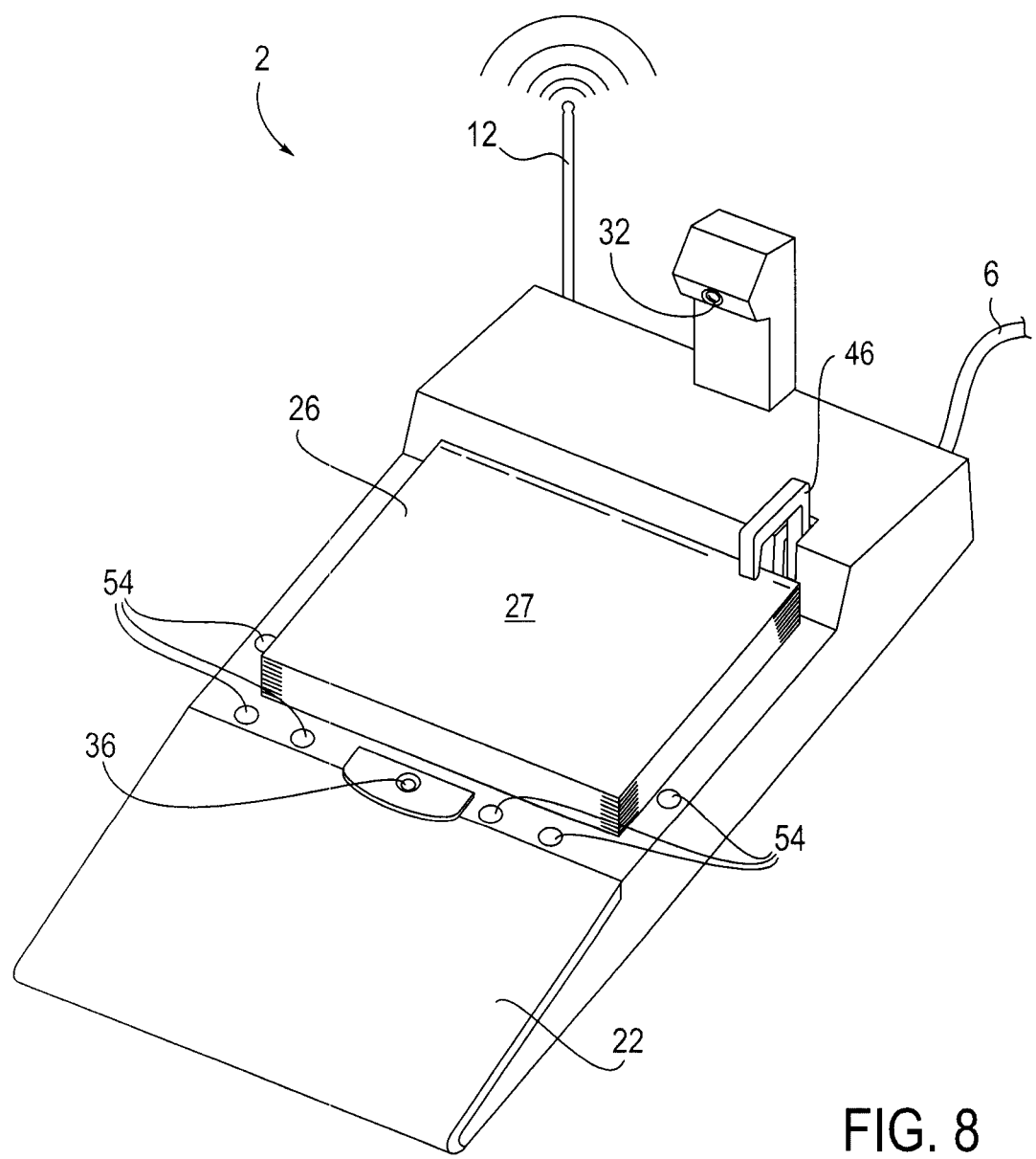
FIG. 8 shows note capture device 2 in an example embodiment which includes wireless communication subsystem 12.

FIG. 8 shows note capture device 2 in an example embodiment which includes wireless communication subsystem 12. Wireless communication subsystem 12 is disposed partially as an antenna, which may be internal or external, to note capture device 2 combined with circuitry mounted on printed circuit board 38 (not shown). Various communications protocols may be used with wireless communication subsystem 12. Protocols such as Blue Tooth, wireless LAN protocols, cellular telephone protocols, etc. are well known to those skilled in the art. Various alternative embodiments include IR and the like. Additionally, apparatus for receiving GPS signals may also be provided. The GPS apparatus may be used to determine the location of note capture device 2 and thus the location information may be stored with the image information as metadata associated with the image. This may assist a user later who is attempting to locate a specific note. Users tend to remember viscerally where they were when they wrote the note as well as a rough estimation of the date without effort. It should be noted that the note capture devices disclosed herein may vary greatly in scale to accommodate larger and smaller applications of the technologies disclosed herein within the scope of the claims.

Figure 9:
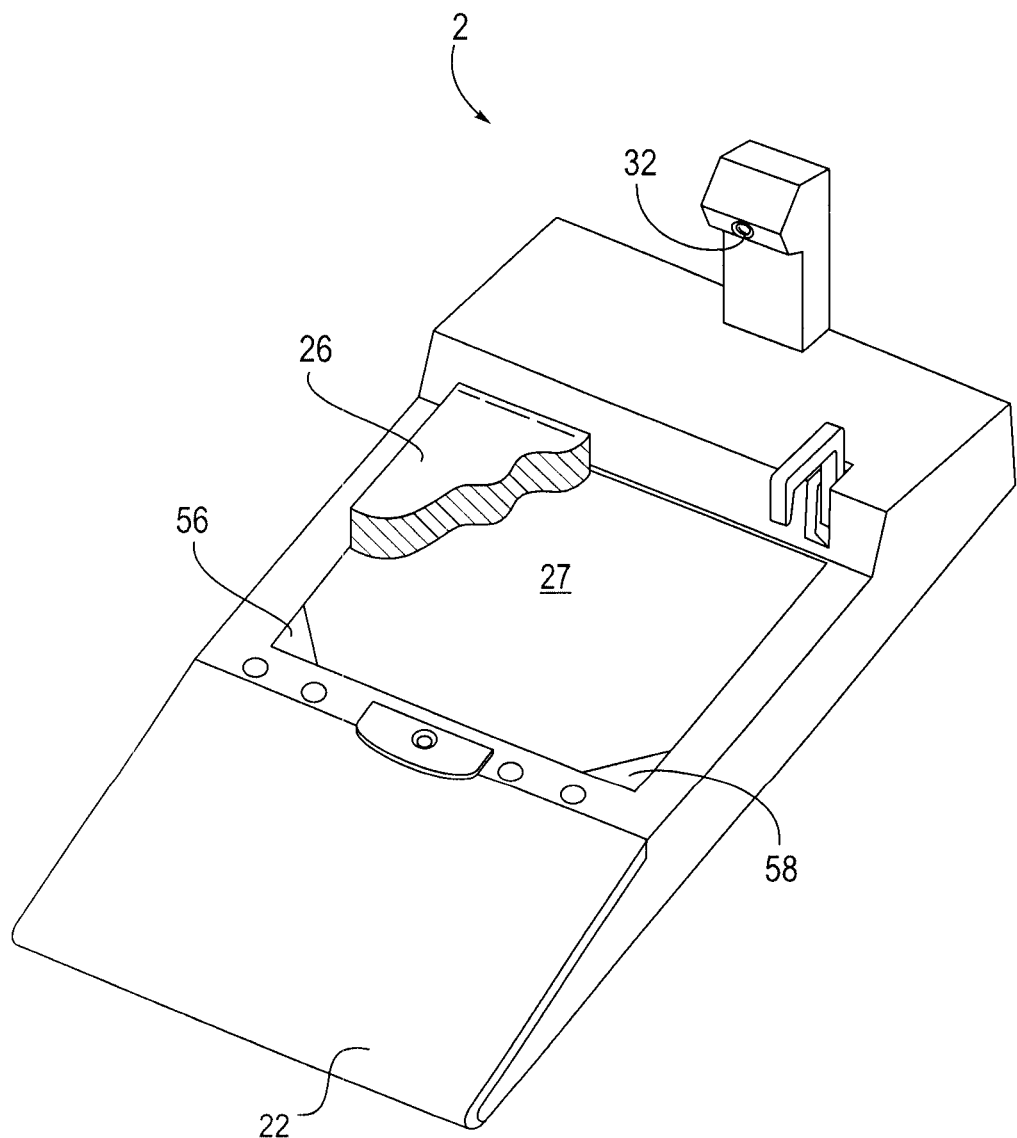
FIG. 9 shows an example embodiment of note capture device 2 wherein special designated areas of the writing surface have specific meaning in terms of the disposition of a note.

FIG. 9 shows an example embodiment of note capture device 2 wherein special designated areas of the writing surface have specific meaning in terms of the disposition of a note. Special areas 56 and 58 are provided in this example to perform user defined functions when a user presses in this area with a writing implement such as a pen, pencil or the like. It should be noted that the detection of a pen down in special areas 56 or 58 may be performed by image analysis of the imagery obtained by camera head 32 or by providing various sensors such as microswitches beneath special areas 56 and 58. In addition to these embodiments, various other sensing techniques may be used, such as light beams being interrupted, etc. The placement of special areas 56 and 58 are only by way of example only and many other configurations are possible. The semantics tied to special areas 56 and 58 are user programmable and may include a variety of functions such as emailing the note captured to a specific, predetermined user, posting the note to an album on a website housed in, for example, server 20 (not shown), sending a fax to a predetermined fax number, etc.

Figure 10:
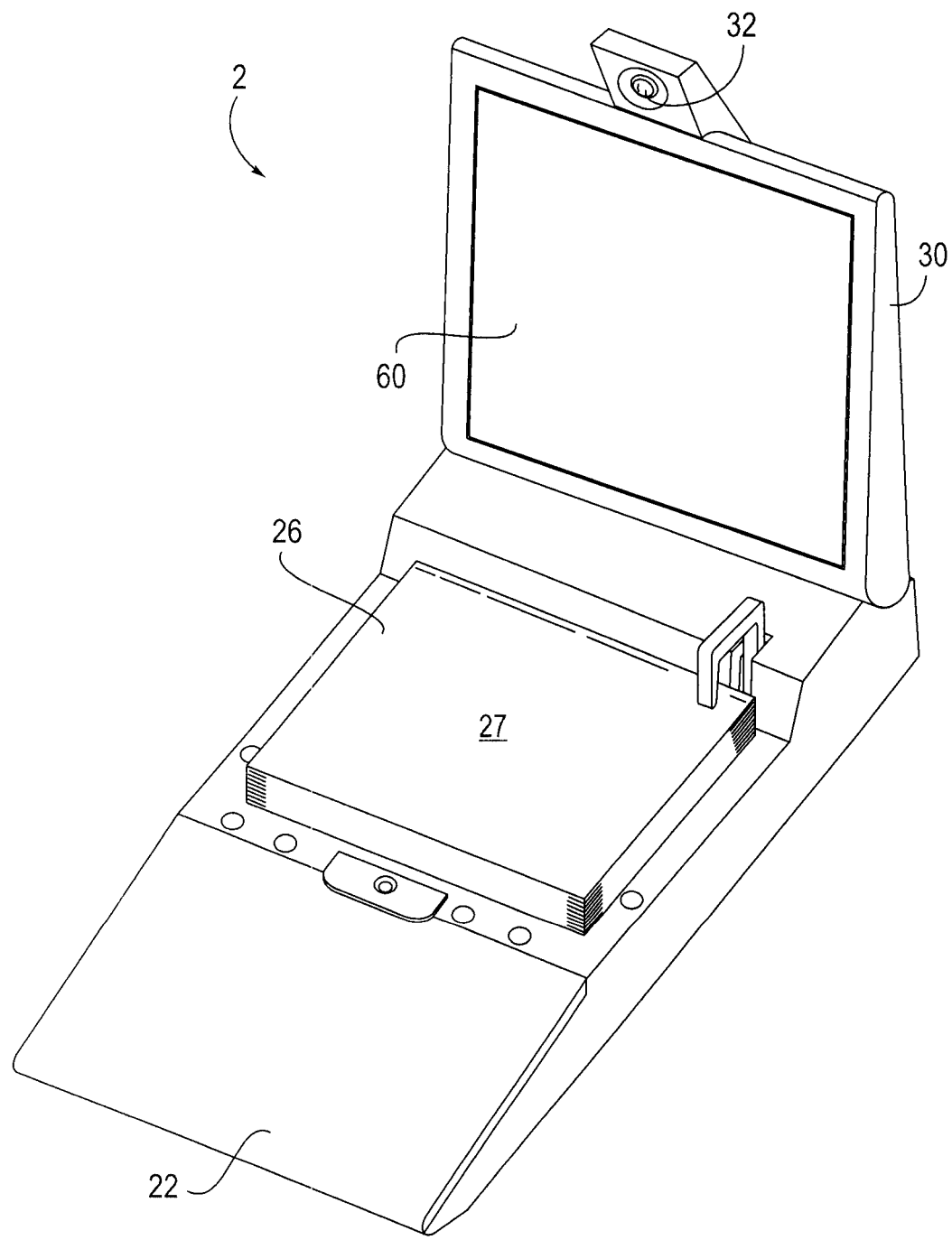
FIG. 10 shows an example embodiment of note capture device 2 which includes an LCD display screen 60 which may be used in conjunction with the capture process to help ensure that a clean image is obtained.
Figure 11:
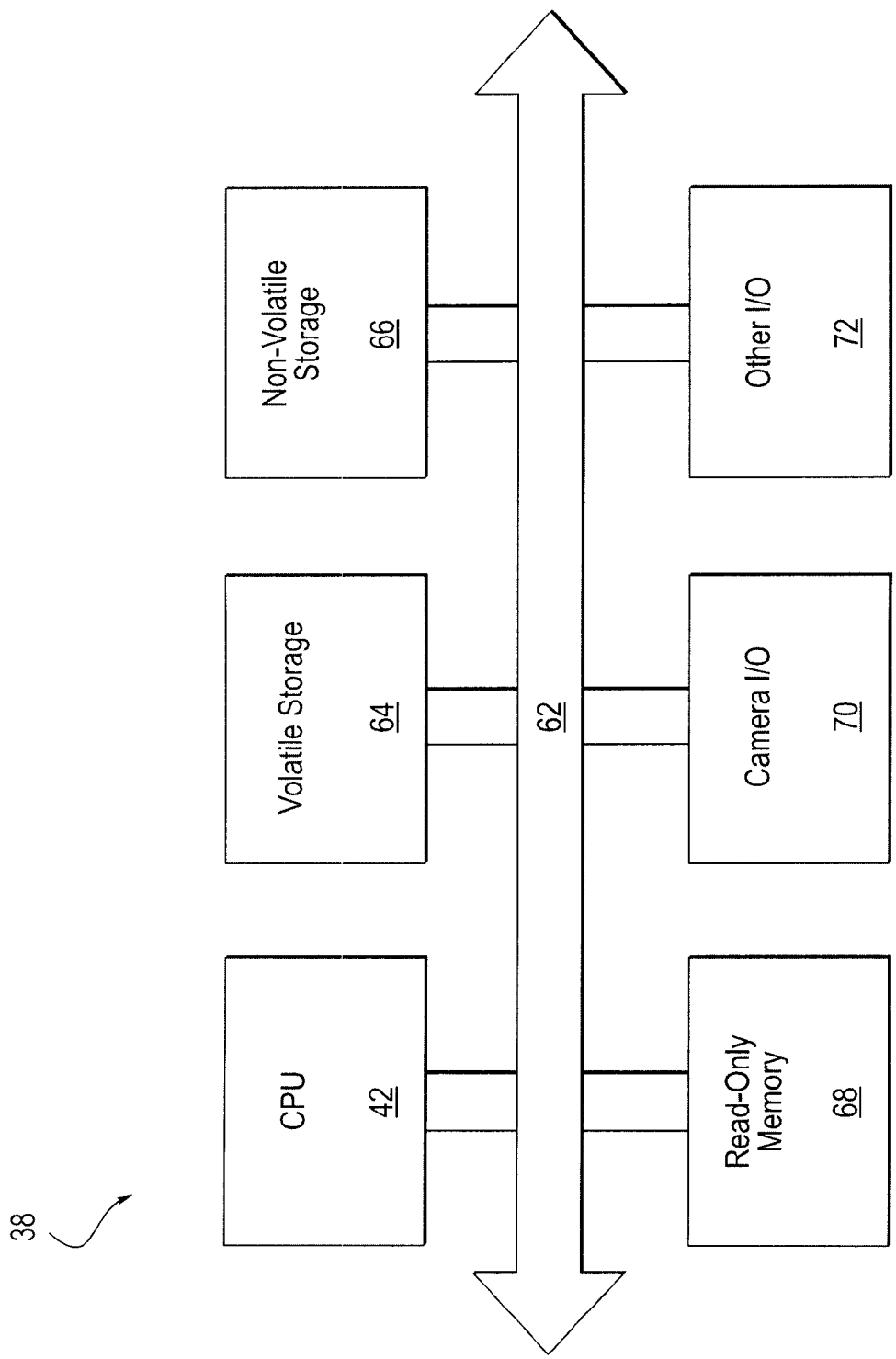
FIG. 11 is a block diagram of the circuitry embodied on printed circuit board 38 of FIGS. 3, 5, 6 and 7.

FIG. 10 shows an example embodiment of note capture device 2 which includes an LCD display screen 60 which may be used in conjunction with the capture process to help ensure that a clean image is obtained. LCD display screen 60 may be used to provide feedback to the user so that the user may see the note that would be captured upon pressing the copy button 24. Also, LCD display screen 60 may be used as a human interface for note capture device 2 and may additionally include touch screen capability so that a pen or finger could be used to interact with various soft keys to effect the operation of note capture device 2 and the distribution of any notes captured. In this example embodiment, structural supporting element 30 is widened to house LCD display screen 60, and camera head 32 is mounted on top of the widened structural supporting element 30. In this embodiment, portions of wireless communication subsystem 12 may be housed within structural supporting element 30 as in other embodiments. Structural supporting element 30, in some implementations, may also include light elements, supported by element 30, that are capable of projecting images. In yet another implementation, image processing may occur within the note capture device 2.

With reference to FIGS. 3, 5, 6 and 7, FIG. 11 is a block diagram of the circuitry embodied on printed circuit board 38 of FIGS. 3, 5, 6 and 7. The various components of printed circuit board 38 are bus 62, processor 42, volatile storage 64, non-volatile storage 66, read-only memory 68, camera IO 70, and other IO 72. A digital memory may also be included in the configuration of FIG. 11. Other I/O 72 may include a communications port operable to transfer data from a digital memory, and other memories and storage devices, to an external device or network. The communications port could be wired or unwired. These various electronic components of printed circuit board 38 operate as an embedded computer within note capture device 2 to provide the various functions of note capture, user interface and communication. Processor 42 is coupled to bus 62 and provides primary computational capability for the various functions of note capture device 2. Volatile storage 64 is used in conjunction with processor 42 to provide temporary storage for the various processes embodied in processor 42. Non-volatile storage 66 may include various storage subsystems such as flash memory or hard disk. Alternative embodiments include various removable media such as CD-ROM, flash cards, and the like. In other words, it is contemplated that the various non-volatile storage subsystems known to those of skill in the art may be used to augment non-volatile storage 66 or Lo replace it. In certain non-limiting example embodiments, one or more notes captured by note capture device 2 may be stored in non-volatile storage 66 and, then, later be uploaded to various connected devices. Read-only memory 68 is provided to contain OS level instructions for processor 42 upon boot and may also provide various library functions for processor 42 which comprise the entirety or portions of the processes running on note capture device 2 which perform user interface, capture, and communication. Note that read-only memory 68 may be programmable. Camera IO 70 may, in one example embodiment, comprise electronic components associated with a camera such as that provided in a cellular telephone. Various alternative embodiments may include the ability to control LEDs 54 in the camera head in terms of their light output, or to activate and deactivate them. An additional embodiment may include servos to change the angle of the camera so that it could, for example, pan a room or other environment to perform a security function or the like. Thus, camera IO 70 is used not only to obtain imagery from camera head 32 but also to control various aspects of its operation. Zoom and focus, as well as image resolution and the like, are all potentially controlled by camera IO 70. Other IO 72 provides IO to the various sensors and microswitches associated with note capture device 2. Additionally, other IO 72 may provide IO to, for example, keyboard or pointing device or an output device such as LCD display screen 60. Additional example embodiments provide for IO associated with LCD display screen 60 in its touch screen embodiment. Other IO 72 may also be used to control various LEDs such as function lamps 28, which may be used to display, for example, the operational status of note capture device 2, communication status and capture status. Other IO 72 may be used to interface with a microphone or GPS apparatus. Similarly, example embodiments of other IO 72 provide communications via wireless communication subsystem 12, USB connector 48 and other communication modes.

In one implementation, anti-keystone image processing of an acquired image is performed, aided by a memory such as ROM 68.

Figure 12:
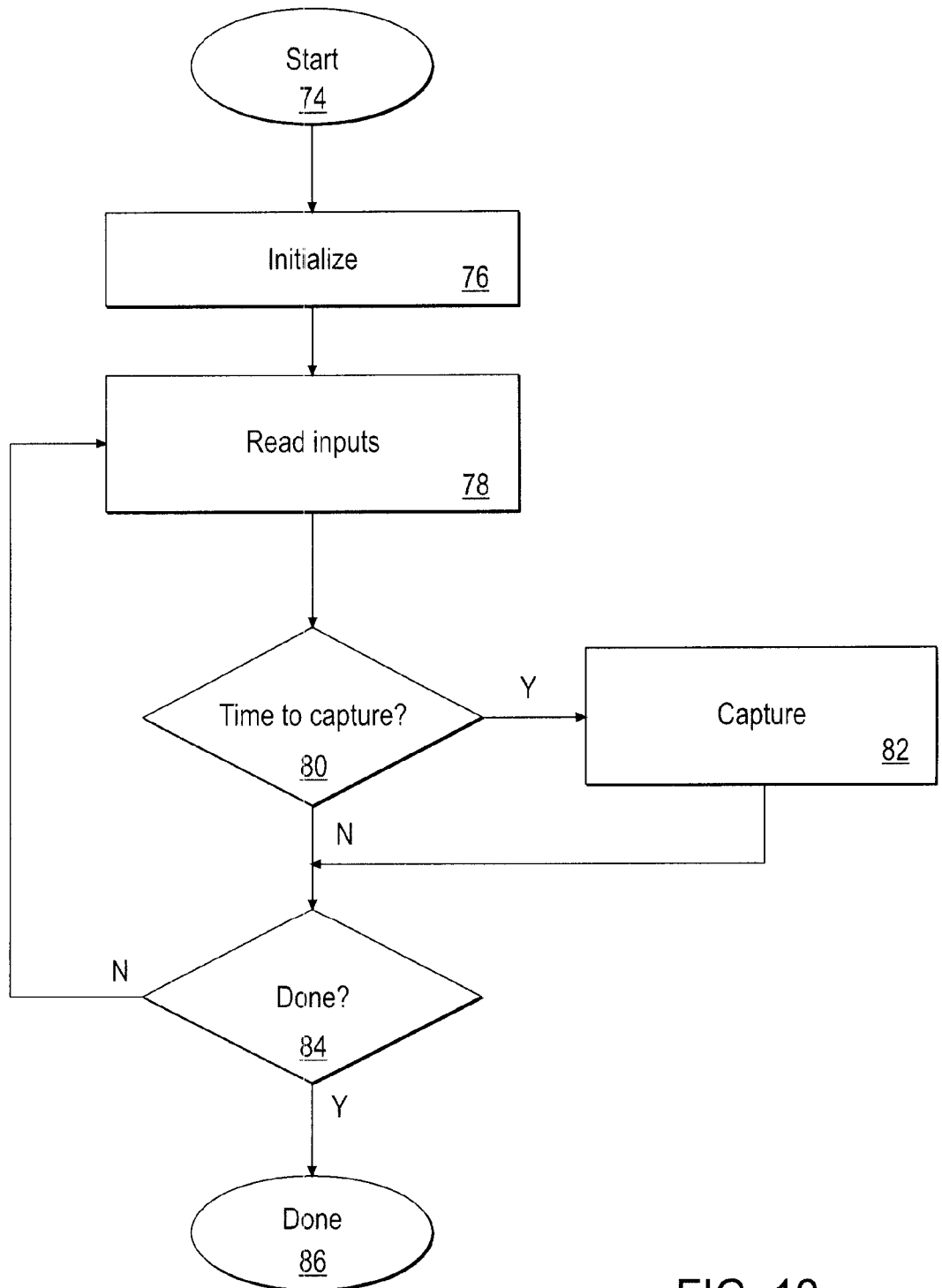
FIG. 12 is a flowchart depicting a capture process running on note capture device 2.

FIG. 12 is a flowchart depicting a capture process running on note capture device 2 and, more specifically, on the various components of printed circuit board 38 notably processor 42 and associated memories. This is only an example of one mode of operation and is given by way of example and not limitation. The code for the operation of FIG. 12 may be embodied in read-only memory 68 or in non-volatile storage 66 or, in some instances, may be downloaded from an external source such as personal computer 4, laptop computer 16, or various other devices with which note capture device 2 may communicate, such as a cellular phone or a server on the internet 18 such as server 20. The operation begins in an operation 74 and continues in an operation 76 in which the process is initialized. Various buffers needed to monitor the imagery obtained from camera head 32 as well as the various sensors of note capture device 2 are initialized at this time. At this point, control passes to an operation 78 in which the various inputs are read. In certain embodiments imagery is obtained on an ongoing basis from camera head 32 and in other embodiments data from camera head 32 is not obtained until specifically requested by the present process. If imagery is obtained on an ongoing basis it can be used to help determine which frames of imagery should be captured. In one embodiment, only imagery is obtained and no other sensor inputs are needed to determine which frames of imagery should be captured as notes. At this point, an operation 80 determines whether or not an image should be captured. This is done by, for example, examining the various sensor inputs such as the signal obtained by copy button microswitch 36, in addition to the other various sensors and imagery obtained by camera head 32. In one low cost embodiment, none of the sensors are needed other than the camera input which can be analyzed to determine that it is time to capture an image. If it is determined in operation 80 that an image should be captured, control passes to an operation 82 wherein a single image is captured. The manner of capture may be to obtain a single image from camera head 32 or from a previously stored image buffer. In either case, the image to be captured is transmitted to an external device such as personal computer 4, laptop computer 16, cellular phone, or server 20 by way of one of the aforementioned devices in communication with note capture device 2. Wireless internet router 14 may also be used to contact various devices on the internet 18, such as server 20, in order to capture the image. Upon completion of operation 82, control is passed to an operation 84 which determines whether or not the operation of FIG. 12 is completed. If it is determined in operation 80 that it is not time to capture an image, control is similarly passed to operation 84 which determines whether or not the operation of FIG. 12 is completed. If it is determined in operation 84 that the operation of FIG. 12 is completed, control then passes to operation 86 which concludes the operation. It should be noted that an alternative to the execution of the operation of FIG. 12 within note capture device 2 is to simply send telemetry such as image and sensor inputs to an external device such as personal computer 4, and then perform the operation of FIG. 12 in said external device. It is further possible to control the various hardware elements by sending messages back from the external device to note capture device 2. In other words, the various processes described herein may be embodied on various devices. In one example embodiment, the note capture device may be embodied in or merged with a cellular telephone with a built in or attached camera.

FIGS. 13, 14 and 15 show portions of a time line which describes some aspects of certain embodiments of the operation of FIG. 12 in greater detail. While in certain example embodiments, the determination of whether or not to capture may be as simple as detecting the user pressing copy button 24 additional example embodiments include the monitoring of various sensors as described in FIG. 12. FIG. 13 represents four moments in time and the various sensor inputs as well as certain information derived from those inputs. The first frame of the time line represents a blank image. At this time, the palm rest sensor does not detect anything, nor the proximity sensors, nor the page remove sensor. Since this image is the first image and has nothing to compare to, the image match is negative. Similarly, image correspond is negative. Image blank is positive since it is easily detected that the image is blank; no ink is present and the user's hand and pen are not in the field of view. The pen down sensor also indicates that there is no current writing activity. Frame two indicates a blank image just as in frame one. Again, there has been no user activity and, thus, the various sensors such as palm rest, proximity, and page remove are all negative. However, since this image is identical to the previous image, image match and image correspond are both positive. Image blank is positive indicating that the image of frame two is blank and pen down is negative indicating that the user is not presently engaged in writing on notepad 26. In frame three, the user has begun writing on notepad 26 with a writing implement such as a pen or a pencil. The portion of the writing that has been completed is viewable in frame three as is the writing implement itself. The palm rest sensor associated with palm rest 22 is activated indicating that palm rest microswitch 40 has detected pressure on palm rest 22. Proximity sensors 54 have detected proximity of an object such as a hand or writing implement and, therefore, the proximity indication is also positive. The page remove sensor does not detect the removal of a page. The image match determination is negative since the present image frame 3 does not match the previous image in frame 2. Image correspond is similarly negative as is image blank. Since some writing has appeared, the image is no longer blank. Pen down indication is positive indicating that the pressure of the pen has activated the pen down sensor. Now, in frame 4 of the time line, more writing has appeared as the user has continued to perform this writing operation. Palm rest sensor associated with palm rest 22 and palm rest microswitches 40 is positive, indicating that the user's palm is resting on palm rest 22. Similarly, the proximity sensors 54 detect the presence of the user's hand or writing implement. The page remove sensor does not detect the removal of a page. Image match and image correspond are negative indicating that this image is different from the previous image. Image blank is negative indicating that this image is not blank since it has writing and a portion of the writing implement in view. The pen down indication is positive indicating that pressure is being applied to notepad 26 and, thus, to notepad rest 34 which comprises a pressure sensor in this embodiment.

Turning now to FIG. 14, frame five shows a note which contains some writing and does not contain any portion of the writing implement or the user's hand. The palm rest indication is negative indicating that pressure is not presently being applied to palm rest 22 and, thus, palm rest microswitches 40 are quiescent. Proximity sensors show that while the user's hand is not in contact with the notepad, it is near enough to notepad 26 to cause the proximity sensors to continue to detect it. The page remove sensor 46 is negative indicating that the user has not attempted to remove the note from notepad 26. Image match is negative indicating that this image is not similar to the previous image within a given tolerance. Methods for comparing images within a specified tolerance for subtle variation and identifying images that are similar enough to indicate a match are well known to those of skill in the art. The image correspond indication is negative indicating that this image does not correspond to any previous image. The image blank indication is negative since this image is not blank and has some writing on it. The pen down indication is negative indicating that pressure is not presently being applied to notepad 26 and, thus, no pressure is detected on notepad rest 34 which, in this embodiment, comprises a pressure sensor. Frame six shows an image which is substantially identical to the previous image. Note that some subtle variation may be present due to changes in lighting conditions and the imperfection inherent in collecting photons in a camera sensor such as that embodied in camera head 32. In frame six the proximity indication is positive indicating that the user's hand is near to the note capture device 2 while the palm rest indication is negative indicating that his hand is not presently resting on palm rest sensor 22 and, thus, palm rest microswitches 40 do not detect pressure. The page removal indication is negative in this instance. Image match is positive which indicates that this image is close enough to the previous image to indicate a match. Image correspond is positive indicating that all of the portions of writing that were present in the previous image five are present in image six. If additional ink were visible in image six, image correspond would still be positive. Thus, the difference between image match and image correspond is that image match is intolerant of additional ink in the later image while image correspond is tolerant of additional ink in the later image. Image blank is negative in this instance indicating that the image is not blank and contains some writing. The pen down indication is negative indicating that there is not currently any pressure being applied to notepad 26 and, thus, pressure to notepad rest 34 which comprises, in this example embodiment, a pressure sensor.

Frame seven shows additional writing has taken place and the writing implement is again partially visible in the image. The palm rest indication is positive indicating that the user's palm is presently applying pressure to palm rest sensor 22 and, thus, palm rest microswitches 40 are activated. Proximity sensors 54 detect the presence of the user's hand in proximity to note capture device 2. Page removal detector 46 is quiescent indicating that the user has not attempted to remove a page. The image match indicator is negative in this instance due to the fact that additional writing has taken place and the writing implement is presently visible in the image, whereas it was not visible in the previous image. Image correspond is similarly negative because the writing implement is present in the image. Image blank is negative in this instance because both the writing implement and some writing is present on the image. The pen down indication is positive indicating that the user is presently applying pressure with the writing implement to notepad 26 and, thus, pressure is being applied to notepad rest 34 which, in this embodiment, comprises a pressure sensor. Frame eight shows the added writing while the writing implement has been removed from the image. The palm rest indication is negative since pressure is not presently being applied to palm rest 22 and, thus, palm rest microswitches 40 are quiescent. Proximity sensors 46 similarly do not detect the presence of the user's hand. Page remove sensor 46 is quiescent so the page removal indication is negative. Image match is negative in this instance because the writing implement was present in the previous image while it is absent in the present image. Image correspond is positive in this instance because this image contains all of the ink present in frames five and six as well as some additional ink. The image blank indication is negative since this image contains some ink. Pen down is negative in this instance indicating that the user is not presently applying pressure to notepad 26.

FIG. 15 depicts frame nine wherein the completed writing of frame eight is visible and the writing implement is not present. The palm rest indication is negative indicating that the user's hand is not applying pressure to palm rest 22 and, thus, palm rest microswitches 40 are quiescent. The proximity indication is positive indicating that the user's hand is near to note capture device 2 as indicated by proximity sensors 54. The page remove sensor indicates that the user has not attempted to remove a note from notepad 26 and, thus, the page remove indication is negative. The image match indication is positive indicating that this image matches the previous image within a tolerance. Also, image correspond is positive indicating that the image of frame nine corresponds to the images of previous frames 5, 6 and 8. The image blank indication is negative since image nine does contain some ink. The pen down indication is negative indicating that the user is presently not writing on notepad 26 and, thus, causing pressure to notepad rest 34. Frame 10 shows the user's thumb present in the image along with the writing. The palm rest indication is positive indicating that the user's hand is presently applying pressure to palm rest 22 and, therefore, has activated palm rest microswitches 40. The proximity indication is positive indicating that the user's hand is close enough to proximity sensors 54 to cause them to sense the user's hand. The page remove indication is negative since the user has not yet attempted to remove a note from notepad 26. Image match is negative since the user's thumb has entered the frame and, similarly, image correspond is negative since no previous image corresponds to this one. Image blank is negative since the frame contains writing and a portion of the user's thumb. Pen down is negative since there is presently no pressure being applied to notepad 26. Frame 11 shows the user peeling the note away from notepad 26. The palm rest indication is negative indicating that no pressure is currently being applied to palm rest 22. Proximity sensors 54 detect the presence of the user's hand and, thus, the proximity indication is positive. The page remove sensor is positive indicating that the user is presently removing a note from notepad 26. The presence of the page removal indication is important since it indicates that the user has completed any writing operations on the note. In this frame, the image match indication is negative since the user's thumb is visible in the image and the note is being peeled back. Similarly, the image correspond indication is negative. Image blank is negative since the user's hand and the edges of the note are visible. Pen down is negative indicating that pressure is presently not being applied to notepad 26. Frame 12 contains a blank image. The palm rest indication is negative indicating that the user is presently not applying pressure with his hand to palm rest 22. The proximity indication is negative indicating that the proximity sensors 54 are not presently detecting the presence of a user's hand. The page remove sensor is negative indicating that the user is not presently removing a note. Image match is negative indicating that this image does not match any previous image that has been taken since a page removal. Similarly, image correspond is negative since there has been no previous image since the most recent page removal. Image blank is positive indicating that this image is blank. Pen down is negative indicating that pressure is presently not being applied to notepad 26.

With reference to FIGS. 12, 13, 14 and 15, the operation of FIG. 12 may take the form of various embodiments some of which are described here as examples. These examples should be construed in a non-limiting way. For example, the various frames, 1 through 12 of FIGS. 13, 14 and 15 may be considered instances in time in which operation 78 of FIG. 12 samples the various inputs. The various inputs are, then, buffered so that they may be analyzed in operation 80 and further processed in operation 82. Operation 80, which determines that an image is to be captured may be triggered by, for example, a positive indication for the page remove sensor. It must be emphasized that this is only one way to determine that it is time to capture. Other example embodiments include the detection of the pressing of capture button 24 and, in the alternative, an embodiment that requires no sensors or buttons other than the imagery itself. Various combinations of the various sensors and buttons and imagery may also be used. When operation 80 of FIG. 12 determines that it is time to capture, control passes to operation 82 of FIG. 12 which induces the capture of an image to an external device such as, for example, personal computer 4, laptop computer 16, cell phone 17, or server 20. Alternatively, the captured image may be buffered in a non-volatile storage medium such as flash memory, to be later uploaded to an external device or through the use of removable media physically loaded into an external device. It should be noted that operation 82 of FIG. 12 performs capture of an image either to an external device or to non-volatile storage but the image that is captured is not necessarily the most recent image taken by camera head 32, but rather, the most recent stable image. In certain embodiments, it is required that the image be stable and various sensors such as pen down do not detect the presence of a writing implement. This would, for example, prevent accidental capture of an image that was stable and yet contained a portion of the writing implement or other foreign object that did not happen to be moving. In certain embodiments, the most recent stable image would correspond to various previous images over a period of time. In an alternate embodiment, operation 82 of FIG. 12 would simply take the most recent image available from camera head 32. This kind of capture would be suitable when a user would, for example, click on copy button 24. In certain embodiments, encryption may be used to protect the note data and associated metadata. In one embodiment, an asymmetric encryption algorithm would be used to encrypt the data so that the data would be useless unless it were handled by an authorized server or other recipient with the appropriate private key. This approach has the advantage of manufacturing ease since the public key could be built in to each note capture device without customization per each device. This would allow for a centrally controlled service to control the distribution of the content, since the data would be unintelligible while in transit until it reached a server or other device that could decrypt it using the private key. In certain embodiments, the public key would be updated periodically to the note capture devices. Other encryption techniques would allow for a unique key per note capture device. Symmetric encryption algorithms are also contemplated. In certain embodiments the encryption would not be centrally controlled, but rather would allow for each user to generate or obtain keys as needed to protect the security of his notes on an individual basis. The user could for example have a plurality of keys, and could select from the keys manually or automatically to perform encryption and decryption.

Figure 16:
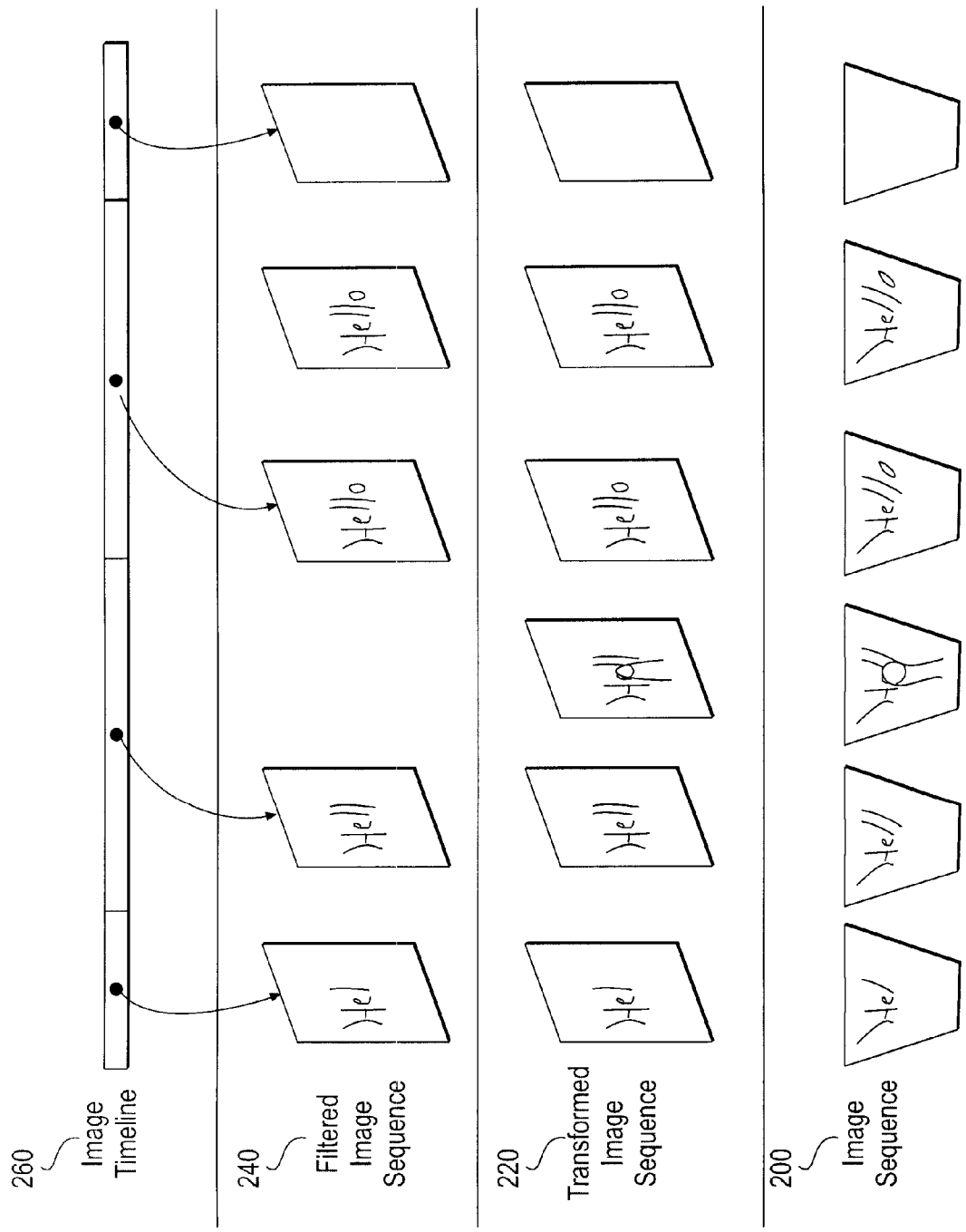
FIG. 16 is a diagram showing an alternate embodiment for employing a "data abstraction" technique to process the data from the camera sensor in order to achieve a high level "Image Timeline"

FIG. 16 is a diagram showing an alternate embodiment for employing a "data abstraction" technique to process the data from the camera sensor in order to achieve a high level "Image Timeline" which can be used by high level software to determine which image(s) are to be captured, in association with the process of FIG. 12. As is well known to those of skill in the art, data abstraction involves developing a transformed "view" of a data set (such as the image stream from the camera head). Subsequent transformations may be developed as higher level "views" each employing a lower level "view" to provide lower level functionality.

It is contemplated that the image stream would, in certain embodiments, cyclically consume a paging buffer, with older unneeded portions being discarded to make room for newer portions.

While many combinations will be evident to persons of skill in the art, an example of such data abstraction techniques is shown in FIG. 16. At the lowest level, an image sequence 200 represents raw images derived from the sensor. In certain embodiments, the images may appear oblique to the viewer since the camera angle may vary according to the juxtaposition of the camera head and the writing surface. A transformed image sequence 220 provides a transformed image sequence which performs a geometric correction such that the image sequence 200 may now be viewed as series of orthographic images. A filtered image sequence 240 may, for example, provide the same orthographic images that are provided by transformed image sequence 220, but remove any that contain material to be discarded. The criteria for classifying images as containing unwanted material will vary greatly depending on the specific application. In certain non-limiting example embodiments, images that contain colors other than the background color and the ink color would be classified as containing unwanted imagery. The determination of ink color could be derived from pixels that stabilize to a non-background color. Other methods, such as the detection and exclusion of images that contain flesh tones are possible, as are many methods that involve recognition of moving objects etc. These embodiments are given by way of example, and should not be construed in a limiting way. Image timeline 260 provides, in this example, a view of the filtered image sequence that can be accessed by time index. This is but one of many possible examples. Using the image timeline, the most recent stable non-blank image, for example, could be selected upon finding a blank image. The recent the most recent stable non-blank image could then be selected as the image to capture, in this non-limiting example embodiment.

Figure 17:
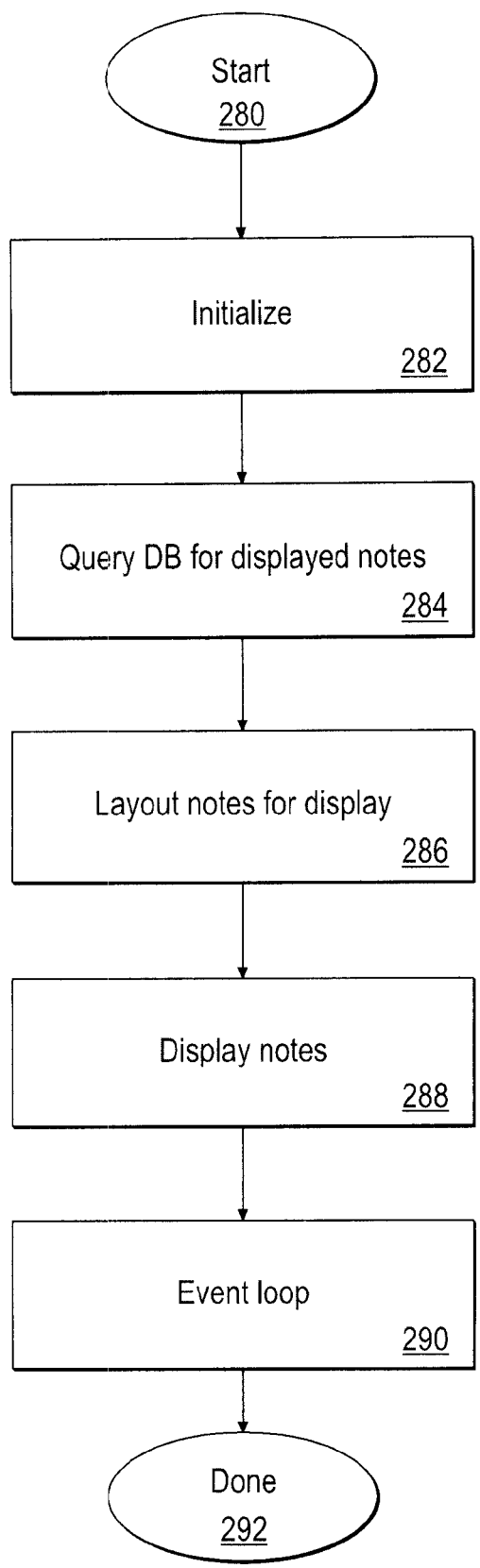
FIG. 17 is a flow chart depicting an operation of application software used in conjunction with the notes captured by note capture device 2.

FIG. 17 is a flow chart depicting an operation of application software used in conjunction with the notes captured by note capture device 2. It should be noted that this applications software may be embodied in various forms on a variety of devices, including for example personal computers, cell phones, servers, laptops, as well as note capture device 2 itself.

The operation begins in an operation 280, and continues in an operation 282 wherein buffers are allocated and initialized, and objects are instantiated which represent the application, user interface elements, and the database containing the captured notes, etc. Then in an operation 284, the database is queried for notes to be displayed. An operation 286 performs a geometric layout of the notes in preparation for their display. Then in an operation 288, the notes are displayed to the user. An event loop operation 290 then enters an event loop to process events related to user activity, and communication with other operations such as the operation of FIG. 12. Upon completion of event loop 290, the operation is concluded in an operation 292.

Figure 18:
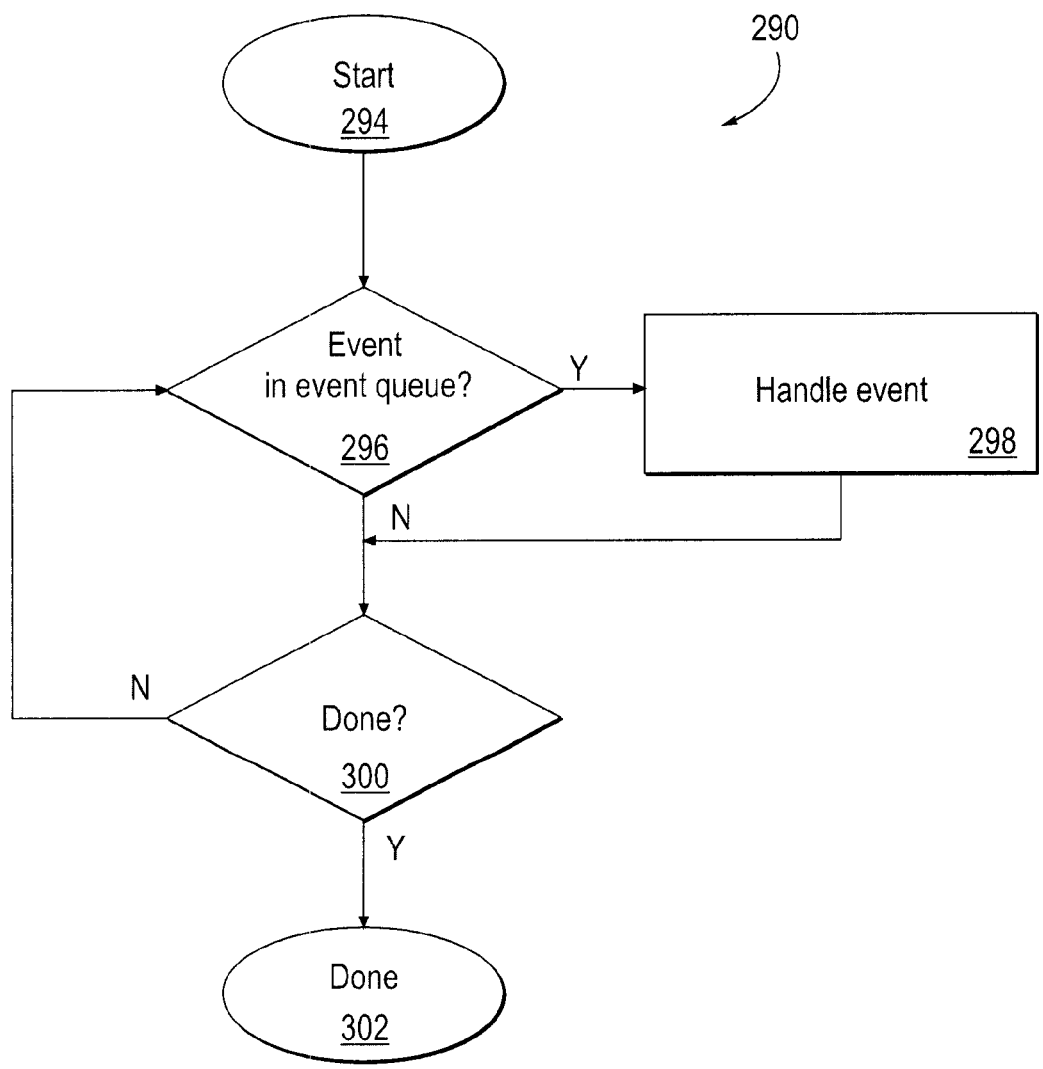
FIG. 18 is a flowchart which depicts an example operation event loop operation 290 of FIG. 17 in greater detail.

FIG. 18 is a flowchart which depicts an example operation event loop operation 290 of FIG. 17 in greater detail. The operation begins in an operation 294, and continues in an operation 296 which determines whether or not there is an event available in the event queue. This decision operation is shown here as a conditional but could also be implemented as an interrupt driven operation that blocks the current thread of execution until an event is available. Many varied implementations will be evident to those of skill in the art. If it is determined that an event is available, a handle event operation 298 handles the event. Once the event has been handled control is then passed to decision operation 300. If in operation 296 it is determined that no event is available, control is passed to operation 300. Operation 300 determines whether event loop operation 290 is completed. For example, it may check whether a power down operation has been initiated, or an application quit operation has been initiated by a previously handled user event. If it is determined in operation 300 that the event loop operation 290 is completed, then control is passed to operation 302 which concludes the operation. If on the other hand, decision operation 300 determines that the event loop operation 290 is not completed, control passes to operation 296 which continues the operation.

Figure 19:
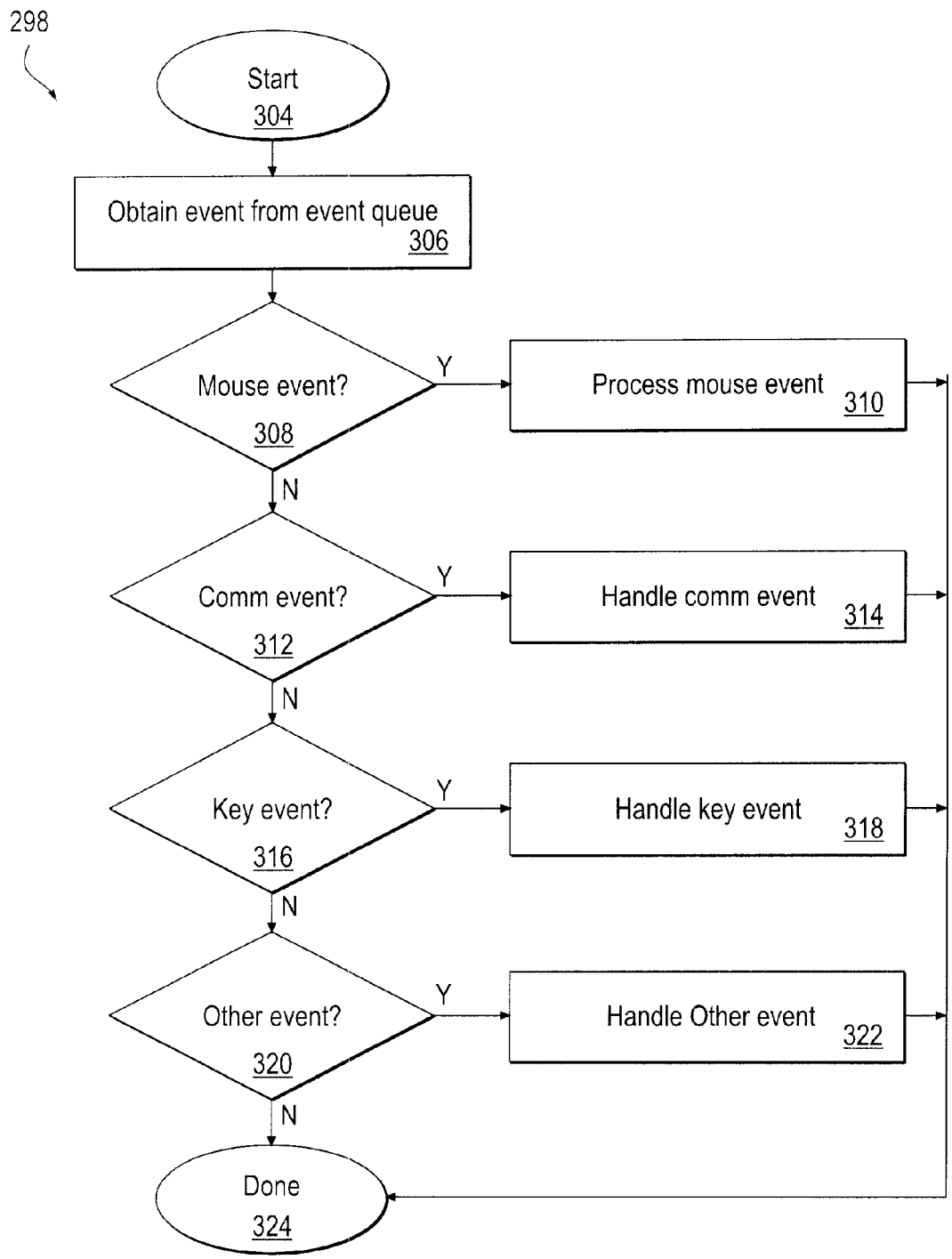
FIG. 19 is a flowchart which depicts an example handle event operation 298 of FIG. 18 in greater detail.

FIG. 19 is a flowchart which depicts an example handle event operation 298 of FIG. 18 in greater detail. The operation begins in an operation 304 and continues in an operation 306 which obtains an event from the event queue.

Then in a decision operation 308, a determination is made as to whether or not the event is a mouse event. If it is determined that the event is a mouse event, control passes to an operation 310 which processes the mouse event by further dispatching it to the object instance that is presently designated to receive it. This is generally done by determining the coordinates of the mouse event, and dispatching it to the GUI object that occupies those coordinates. This kind of dispatching is well known to those of skill in the art. In processing this event, the object may modify instance variables, buffers, etc. and signal to other objects to perform various tasks related to the handling of this event. Upon completion of operation 310, control passes to operation 324 which concludes the operation 298. If on the other hand it is determined in operation 308 that the event is not a mouse event, control is then passed to operation 312.

Then in a decision operation 312, a determination is made as to whether or not the event is a communications event. If it is determined that the event is a communications event, control passes to an operation 314 which processes the mouse event by further dispatching it to the object instance that is presently designated to receive it. This is generally done by examining the communications event and dispatching it based on the type of communication as well as addressing information that may be contained in the event or associated communication buffer. This kind of dispatching is well known to those of skill in the art. One example of a communication event is the receiving a note that has been captured by note capture device 2. To handle such an event, the note would be received and assembled in non-volatile storage, and then, in one example embodiment, a database insert operation would be performed. Optionally, recognition software could be used to derive text from the note image so that the text could be searched later as a means to locate the note among a database of many notes.

In processing a communication event, the object may modify instance variables, buffers, etc. and signal to other objects to perform various sub-tasks related to the handling of this event. Additionally, the handling of communication events often comprises initiating or communicating with an existing thread of execution, especially for time consuming tasks such as handwriting recognition. Upon completion of operation 314, control passes to operation 324 which concludes the operation 298. If on the other hand it is determined in operation 312 that the event is not a communications event, control is then passed to operation 316.

Then in a decision operation 316, a determination is made as to whether or not the event is a key event. If it is determined that the event is a key event, control passes to an operation 318 which processes the mouse event by further dispatching it to the object instance that is presently designated to receive it. This is generally done by determining which GUI object currently has "focus;" a designation often associated with an object that has most recently been "clicked." This kind of dispatching is well known to those of skill in the art. In processing this event, the object may modify instance variables, buffers, etc. and signal to other objects to perform various tasks related to the handling of this event. Upon completion of operation 318, control passes to operation 324 which concludes the operation 298. If on the other hand it is determined in operation 316 that the event is not a key event, control is then passed to operation 320.

Then in a decision operation 320, a determination is made as to whether or not the event is another event. If it is determined that the event is an other event, control passes to an operation 322 which processes the mouse event by further dispatching it to the object instance that is presently designated to receive it. For example, the event might involve the insertion of a piece of media into a peripheral device which contains notes to be retrieved. Various combinations will be evident to those of skill in the art. In processing this event, the object may modify instance variables, buffers, etc. and signal to other objects to perform various tasks related to the handling of this event. Upon completion of operation 322, control passes to operation 324 which concludes the operation 298. If on the other hand it is determined in operation 320 that the event is not another event, control is then passed to operation 324.

Certain non-limiting example embodiments provide a note capture device comprising a writing surface, a camera mounted to view the writing surface, and electronic circuitry to capture images of said surface, or various alternative surfaces, including for example, a business card surface. Various image transformations are contemplated which may, for example, correct for an oblique camera angle with respect to the surface(s). Other transformations to enhance an image, or add indicia, logos, etc. are also contemplated. Other information may also be associated with the image data, such as a digital signature to authenticate the data as originating with a specific user etc.

Figure 20A:
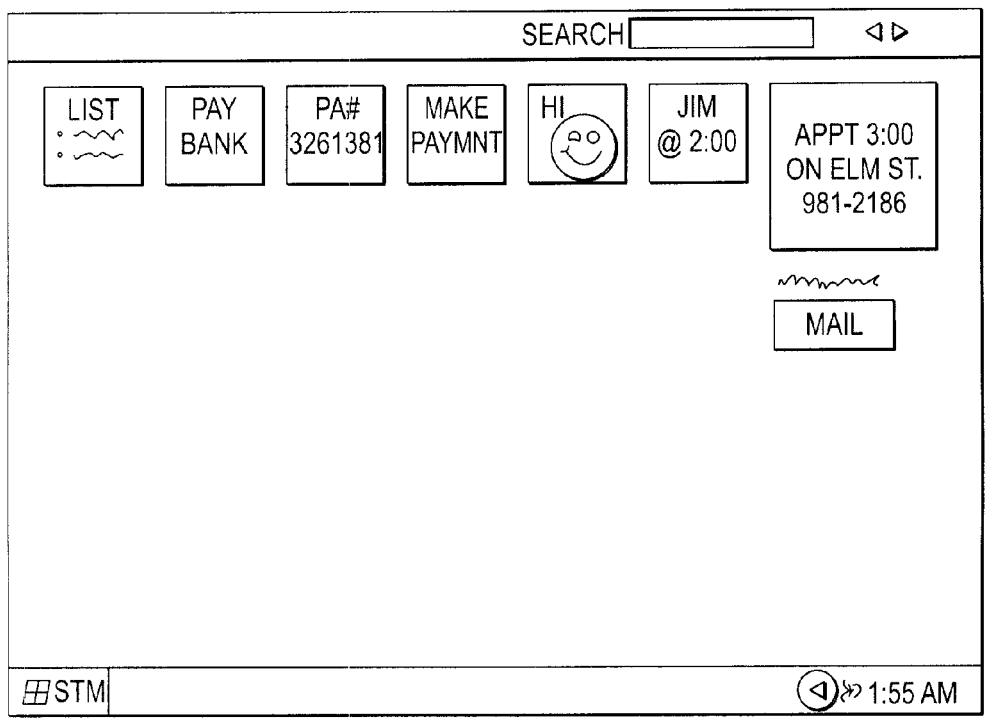
FIGS. 20A and 20B are illustrations of an example embodiment of a graphical user interface (GUI) for the application software.
Figure 20B:
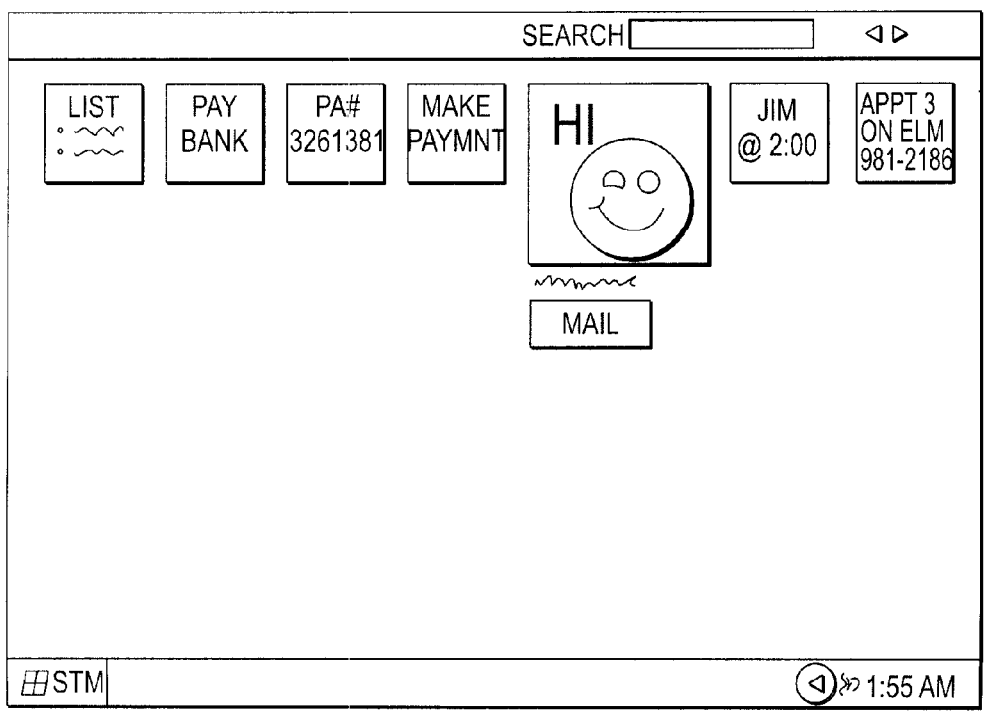

FIGS. 20A and 20B are illustrations showing an example embodiment GUI for the application software. Although many varied embodiments are possible, certain example embodiments provide a scrolling list of thumbnail images derived from a database containing captured notes associated with the application software. "Mousing" over or "clicking" on a note would for example, "select" it and thus it would appear larger to the user, and would provide for further interaction, including viewing and editing of metadata. Various menu functions would be available to provide features such as transmitting the note to another user or to an online album, searching for a note, sorting displayed notes based on time, location of capture, etc.

Figure 21:
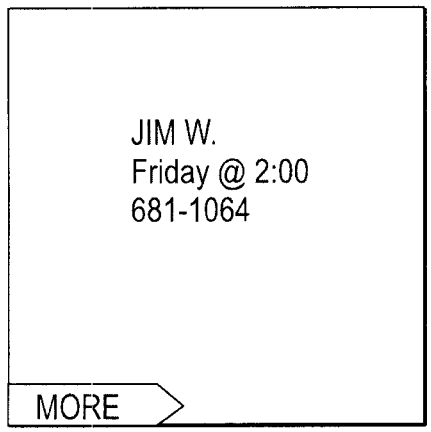
FIG. 21 is a diagram showing an example image & properties feature of the application software.
Figure 22:
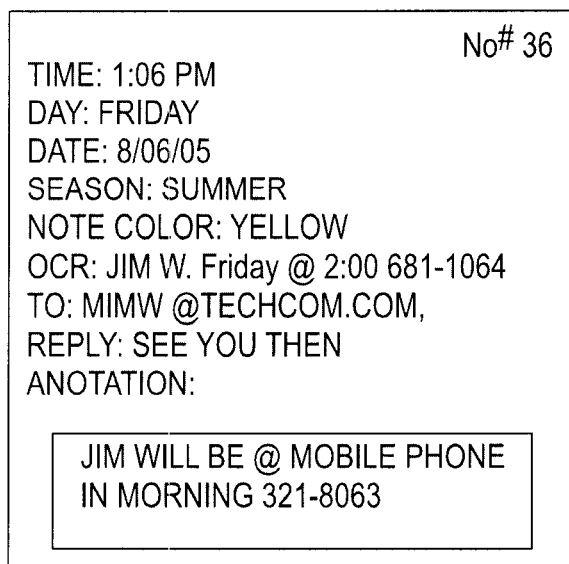
FIG. 22 is a diagram depicting an example metadata display/editing GUI.

FIGS. 21 and 22 are diagrams showing an example image & properties feature of the application software. These views allow for detailed interaction with a particular note, such as viewing and editing metadata, including in certain embodiments handwriting recognition results. It is contemplated that editing in this manner would result in appropriate database interaction including but not limited to query operations, insert operations, delete operations, and update operations. In alternate embodiments, a hierarchical file system would be used in place of a database.

Certain example embodiments provide for automatic detection of the completion of writing a note, and upon detection, induce capture of the completed note. Certain embodiments employ various sensors to detect the completion of the note writing. Other embodiments perform this detection through the use of button click. Still other embodiments perform this detection through image analysis. Various combinations of these embodiments are contemplated.

In certain example embodiments and combinations, captured images are stored internally, transmitted electronically to external devices, such as personal computers, cell phones, servers, etc. The mode of communication between the note capture device and the external device may include a cable coupling the devices directly or indirectly, or a wireless connection which couples the devices directly or indirectly. It is further contemplated that the communication may take place through the use of removable media. Other commonly used methods of transferring data from one device to another are also contemplated.

In certain embodiments, a screen is provided to allow a user to interact with the note capture device for the purpose of routing captured notes to various destinations, and to direct the various modes of communication such various protocols including, by way of example and not limitation, SMTP, FTP, SFTP, HTTP, HTTPS, file sharing protocols such as those provided by various commercially available operating systems, including Windows, Mac OS, Linux, etc.

In various modes of operation, handwriting recognition software may be used to produce text representing the captured note in whole or in part. Such recognized text may accompany the image information associated with a note, or may be used in place of said image information.

The image information associated with a note may be transformed in various ways, including being transformed into stroke information, or compressed etc.

Figure 23:
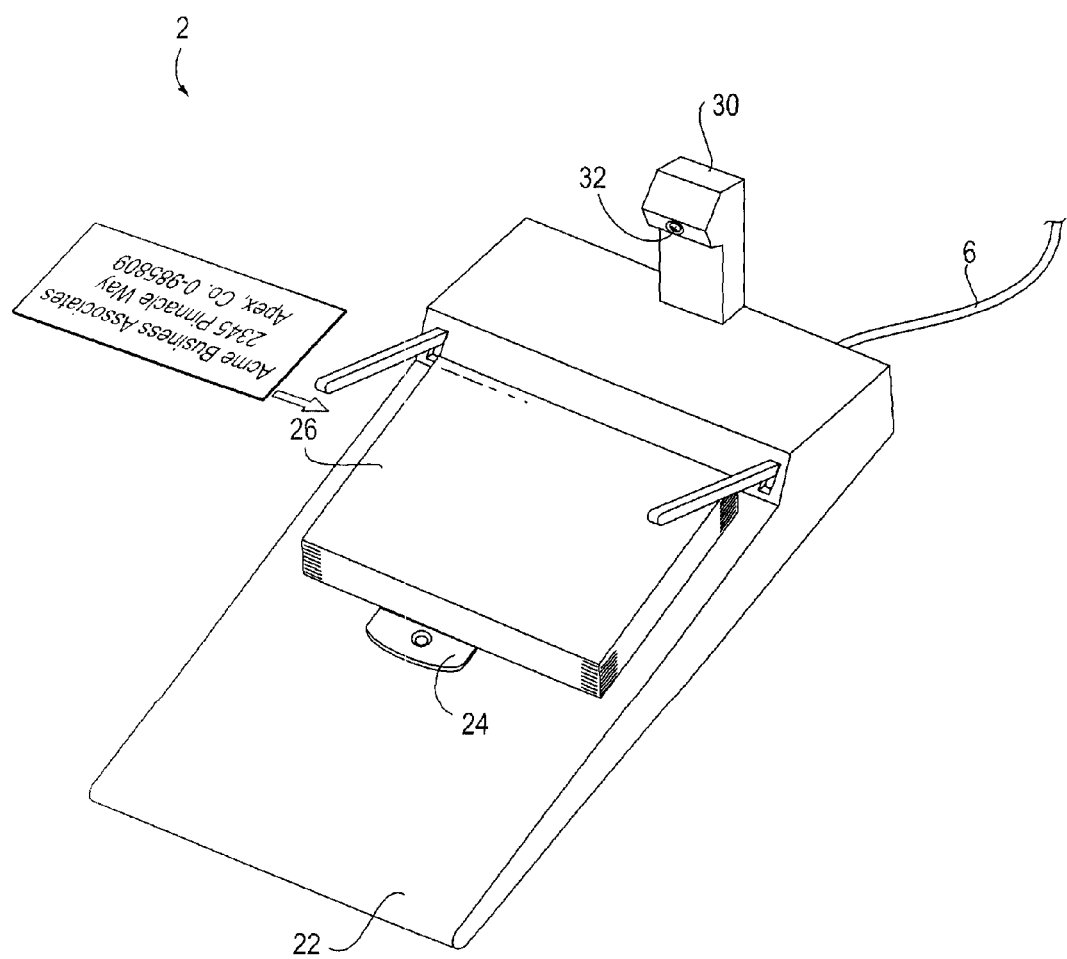
FIG. 23 is a diagram depicting an alternate business card scanning example embodiment.

FIG. 23 depicts an alternate example embodiment in which a business card 400 may be captured. The appropriate adjustments to perspective are made in software when mount 402 is flipped up manually by the user. The mount 402 comprises an electrical switch coupled to printed circuit board 38 which induces an electrical signal detectable by processor 42 which ultimately activates this alternate capture mode. In this mode the card is captured and the associated image is processed in accordance with the altered perspective.

These and other embodiments and advantages and other features disclosed herein will become apparent to those of skill in the art upon a reading of the following descriptions and a study of the several figures of the drawing.

Certain aspects of various example embodiments provide application software to view, browse, share, search and edit captured notes, their associated metadata, recognition results, etc. The various example embodiments include human interface software which may be associated with the user's "desktop" or various application windows. Further, it is contemplated that the application software may be embodied on various alternate devices include personal computer, server, cell phone, laptop computer, PDA, or the note capture device itself.

Although various embodiments have been described using specific terms and devices, such description is for illustrative purposes only. The words used are words of description rather than of limitation. It is to be understood that changes and variations may be made by those of ordinary skill in the art without departing from the spirit or the scope of the present invention, which is set forth in the following claims. In addition, it should be understood that aspects of various other embodiments may be interchanged either in whole or in part. It is therefore intended that the claims be interpreted in accordance with the true spirit and scope of the invention without limitation or estoppel.

What is claimed is:
1. A notepad top page image capture device comprising:
an elongated base assembly supporting a notepad including a plurality of sheets of paper including a removable top page which provides a writing surface for a writing implement consisting of at least one of a pen, pencil and the like designed for writing on paper, wherein said notepad is of the type wherein each of said plurality of sheets of paper is provided with a weak, reusable adhesive compound which can removably hold it to another sheet of paper;
a circuit board disposed within said elongated base assembly;
a digital processor attached to said circuit board;
non-volatile memory attached to said circuit board and coupled to said digital processor;
a rigid, fixed post having a lower portion and an upper portion, wherein said lower portion of said post is rigidly fixed to said base assembly;
a solid-state camera device having a fixed optical focus and a fixed depth of field range, said solid-state camera being rigidly fixed to said post proximate said upper portion, said solid state camera device having a fixed field of view inclusive of the writing surface and defining a fixed optical axis that is oblique to and directed towards said writing surface, said solid-state camera being electrically coupled to said circuit board;
a trigger mechanism to indicate a completion of a writing by the writing implement on said writing surface, said trigger mechanism being electrically coupled to said circuit board;
a display screen rigidly fixed between said lower portion and said upper portion of said post and below said camera device, said display screen being configured, at least in part, to display at least a partial image derived from said camera device, said display screen being electrically coupled to said circuit board; and
a communications port electrically coupled to said circuit board, wherein said communications port is at least one of a wired communications port and a wireless communications port;
wherein said digital processor executes code segments stored in said non-volatile memory to communicate with said trigger mechanism, said display screen, said solid-state camera device and said communications port via said circuit board disposed within said elongated base assembly, said digital processor receiving image information from said camera device, said digital processor being configured to automatically perform a predetermined anti-keystone image processing of said image information based upon said fixed optical axis after receiving a signal from said trigger mechanism and to cause a display on said display screen to ensure that a clean image is obtained; and
wherein said base assembly includes a palm rest proximate a first end.

2. A notepad top page image capture device as recited in claim 1 wherein said fixed depth of field range is 2.5 inches to 7.5 inches.

3. A notepad top page image capture device as recited in claim 1 wherein at least a portion of said base assembly is pressure sensitive.

4. A notepad top page image capture device as recited in claim 1 comprising:
an elongated base assembly supporting a notepad including a plurality of sheets of paper including a removable top page which provides a writing surface for a writing implement consisting of at least one of a pen, pencil and the like designed for writing on paper, wherein said notepad is of the type wherein each of said plurality of sheets of paper is provided with a weak, reusable adhesive compound which can removably hold it to another sheet of paper;
a circuit board disposed within said elongated base assembly;
a digital processor attached to said circuit board;
non-volatile memory attached to said circuit board and coupled to said digital processor;
a rigid, fixed post having a lower portion and an upper portion, wherein said lower portion of said post is rigidly fixed to said base assembly;
a solid-state camera device having a fixed optical focus and a fixed depth of field range, said solid-state camera being rigidly fixed to said post proximate said upper portion, said solid state camera device having a fixed field of view inclusive of the writing surface and defining a fixed optical axis that is oblique to and directed towards said writing surface, said solid-state camera being electrically coupled to said circuit board;
a trigger mechanism to indicate a completion of a writing by the writing implement on said writing surface, said trigger mechanism being electrically coupled to said circuit board;
a display screen rigidly fixed between said lower portion and said upper portion of said post and below said camera device, said display screen being configured, at least in part, to display at least a partial image derived from said camera device, said display screen being electrically coupled to said circuit board; and
a communications port electrically coupled to said circuit board, wherein said communications port is at least one of a wired communications port and a wireless communications port;
wherein said digital processor executes code segments stored in said non-volatile memory to communicate with said trigger mechanism, said display screen, said solid-state camera device and said communications port via said circuit board disposed within said elongated base assembly, said digital processor receiving image information from said camera device, said digital processor being configured to automatically perform a predetermined anti-keystone image processing of said image information based upon said fixed optical axis after receiving a signal from said trigger mechanism and to cause a display on said display screen to ensure that a clean image is obtained; and
wherein said base assembly is further provided with at least one proximity sensor.

5. A notepad top page image capture device as recited in claim 1 comprising:
an elongated base assembly supporting a notepad including a plurality of sheets of paper including a removable top page which provides a writing surface for a writing implement consisting of at least one of a pen, pencil and the like designed for writing on paper, wherein said notepad is of the type wherein each of said plurality of sheets of paper is provided with a weak, reusable adhesive compound which can removably hold it to another sheet of paper;
a circuit board disposed within said elongated base assembly;

a digital processor attached to said circuit board;
non-volatile memory attached to said circuit board and coupled to said digital processor;
a rigid, fixed post having a lower portion and an upper portion, wherein said lower portion of said post is rigidly fixed to said base assembly;
a solid-state camera device having a fixed optical focus and a fixed depth of field range, said solid-state camera being rigidly fixed to said post proximate said upper portion, said solid state camera device having a fixed field of view inclusive of the writing surface and defining a fixed optical axis that is oblique to and directed towards said writing surface, said solid-state camera being electrically coupled to said circuit board;
a trigger mechanism to indicate a completion of a writing by the writing implement on said writing surface, said trigger mechanism being electrically coupled to said circuit board;
a display screen rigidly fixed between said lower portion and said upper portion of said post and below said camera device, said display screen being configured, at least in part, to display at least a partial image derived from said camera device, said display screen being electrically coupled to said circuit board; and
a communications port electrically coupled to said circuit board, wherein said communications port is at least one of a wired communications port and a wireless communications port;
wherein said digital processor executes code segments stored in said non-volatile memory to communicate with said trigger mechanism, said display screen, said solid-state camera device and said communications port via said circuit board disposed within said elongated base assembly, said digital processor receiving image information from said camera device, said digital processor being configured to automatically perform a predetermined anti-keystone image processing of said image information based upon said fixed optical axis after receiving a signal from said trigger mechanism and to cause a display on said display screen to ensure that a clean image is obtained; and
wherein said base assembly is further provided with a page removal detector.

6. A notepad top page image capture device as recited in claim 1 further comprising at least one light element supported by said post that is capable of projecting an image.

7. A notepad top page image capture device as recited in claim 1 further comprising at least one palm rest detector configured to detect pressure on said palm rest.

8. A notepad top page image capture device as recited in claim 1 further comprising at least one LED capable of illuminating said writing surface.

9. A notepad top page image capture device as recited in claim 1 wherein said writing surface has at least one designated area with a specific meaning.

10. A notepad top page image capture device as recited in claim 1 wherein said display screen includes touch screen capability.

11. A notepad top page image capture device as recited in claim 1 wherein said display screen is supported by said post.

12. A notepad top page image capture device as recited in claim 1 wherein a structural supporting element for said display screen comprises said post.

13. A notepad top page image capture device as recited in claim 1 further comprising a business card holder configured to hold a business card proximate to said camera device.

* * * * *